(12) United States Patent
Takahashi et al.

(10) Patent No.: US 7,746,421 B2
(45) Date of Patent: Jun. 29, 2010

(54) OPTICAL ELEMENT, LIGHT CONDENSATION BACKLIGHT SYSTEM, AND LIQUID CRYSTAL DISPLAY

(75) Inventors: Naoki Takahashi, Ibaraki (JP); Kazutaka Hara, Ibaraki (JP); Miki Shiraogawa, Ibaraki (JP); Kentarou Takeda, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 898 days.

(21) Appl. No.: 10/576,614

(22) PCT Filed: Aug. 24, 2004

(86) PCT No.: PCT/JP2004/012119
§ 371 (c)(1),
(2), (4) Date: Apr. 21, 2006

(87) PCT Pub. No.: WO2005/040869
PCT Pub. Date: May 6, 2005

(65) Prior Publication Data
US 2007/0132914 A1    Jun. 14, 2007

(30) Foreign Application Priority Data
Oct. 23, 2003  (JP) .............................. 2003-363220

(51) Int. Cl.
*G02F 1/1335* (2006.01)
(52) U.S. Cl. ....................................................... 349/62
(58) Field of Classification Search .................. None
See application file for complete search history.

(56) References Cited

U.S. PATENT DOCUMENTS 4,984,872 A    1/1991   Vick 6,172,722 B1 *  1/2001   Sharp ........................... 349/80

(Continued)

FOREIGN PATENT DOCUMENTS

DE         38 36 955 A1    5/1990

(Continued)

OTHER PUBLICATIONS

Translation of the International Preliminary Report on Patentability of International Application No. PCT/JP 2004/012119, with Form PCT/IB/373 and Form PCT/ISA/237.

(Continued)

*Primary Examiner*—Timothy Rude
(74) *Attorney, Agent, or Firm*—Westerman, Hattori, Daniels & Adrian, LLP

(57) ABSTRACT

An optical element comprising: a polarizing element (A), separating incident light into polarization to then emit light, and made of a cholesteric liquid crystal, and a linearly polarized light reflection polarizer (B) transmitting linearly polarized light with one polarization axis and selectively reflecting linearly polarized light with the other polarization axis perpendicular to the one polarization axis, wherein the polarizing element (A) has a distortion rate with respect to emitting light to incident light in the normal direction of 0.5 or more and a distortion rate with respect to emitting light to incident light at an angle inclined from the normal direction by 60 degrees or more of 0.2 or less, the polarizing element (A) has a function increasing a linearly polarized light component of emitting light as incidence angle is larger; is capable of condensation and collimation of incident light from a light source and capable of suppressing transmission of light in an arbitrary direction.

30 Claims, 13 Drawing Sheets

U.S. PATENT DOCUMENTS

| | | | |
|---|---|---|---|
| 6,307,604 | B1 | 10/2001 | Hikmet et al. |
| 6,417,892 | B1* | 7/2002 | Sharp et al. ............... 348/742 |
| 6,537,624 | B1* | 3/2003 | Suzuki et al. .............. 428/1.3 |
| 6,573,961 | B2* | 6/2003 | Jiang et al. ................ 349/115 |
| 6,636,291 | B2* | 10/2003 | Van De Witte et al. ...... 349/187 |
| 6,667,784 | B2* | 12/2003 | Sharp et al. ................. 349/78 |
| 6,710,831 | B1* | 3/2004 | Winker et al. .............. 349/115 |
| 6,738,114 | B1* | 5/2004 | Faris ........................... 349/98 |
| 6,757,039 | B2* | 6/2004 | Ma ............................. 349/115 |
| 6,882,384 | B1* | 4/2005 | Sharp .......................... 349/78 |
| 7,564,518 | B2* | 7/2009 | Ma ............................... 349/98 |
| 2002/0034009 | A1 | 3/2002 | Broer et al. |
| 2002/0036735 | A1 | 3/2002 | Arakawa et al. |
| 2003/0063236 | A1 | 4/2003 | Watson et al. |
| 2003/0063245 | A1* | 4/2003 | Bowley et al. ............. 349/115 |
| 2003/0184862 | A1* | 10/2003 | Sahouani et al. ........... 359/490 |
| 2003/0231266 | B2* | 12/2003 | Ma ............................. 349/113 |
| 2004/0032548 | A1* | 2/2004 | Li et al. ....................... 349/98 |
| 2004/0085660 | A1 | 5/2004 | Hara |
| 2004/0090577 | A1 | 5/2004 | Hara |
| 2004/0095531 | A1* | 5/2004 | Jiang et al. ................. 349/115 |
| 2004/0095532 | A1* | 5/2004 | Parri et al. ................. 349/117 |

FOREIGN PATENT DOCUMENTS

| | | |
|---|---|---|
| DE | 42 22 028 A1 | 1/1994 |
| EP | 0 578 302 A1 | 1/1994 |
| JP | 2-158289 | 6/1990 |
| JP | 6-235900 | 8/1994 |
| JP | 2561483 | 12/1996 |
| JP | 10-321025 | 12/1998 |
| JP | 11-231130 | 8/1999 |
| JP | 2001-516066 | 9/2001 |
| JP | 2001-318230 | 11/2001 |
| JP | 2001-521643 | 11/2001 |
| JP | 2002-90535 | 3/2002 |
| JP | 2002-258048 | 9/2002 |
| JP | 2004-4763 | 1/2004 |
| JP | 2004-4764 | 1/2004 |
| WO | WO 02/25687 | 3/2002 |
| WO | WO 02/256687 | 3/2002 |
| WO | WO 03/027731 | 4/2003 |
| WO | WO 03/027756 | 4/2003 |

OTHER PUBLICATIONS

International Search Report of PCT/JP2004/012119, dated Oct. 26, 2004.

Translation of the International Preliminary Report on Patentability of International Application No. PCT/JP 2004/012119, with Form PCT/ISA/237.

* cited by examiner

[FIG. 1(A)]
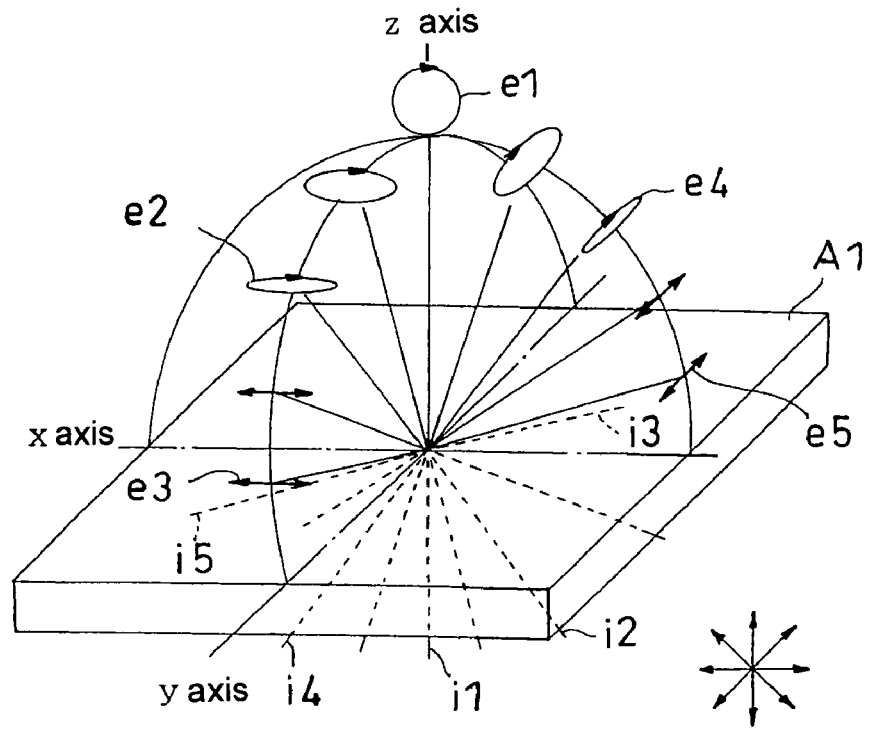
[FIG. 1(B)]
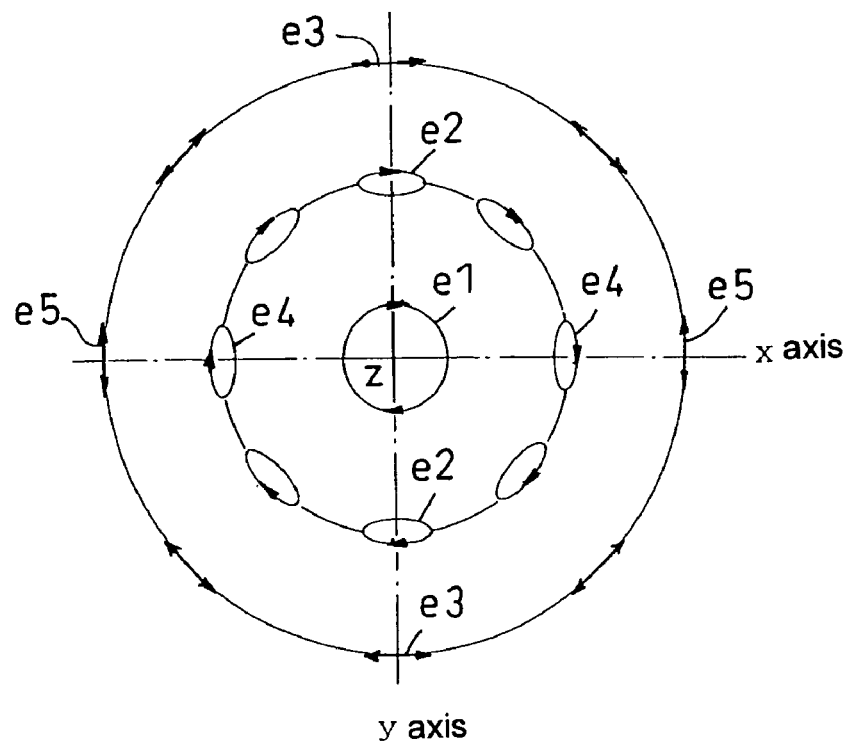

[FIG. 2(A)]
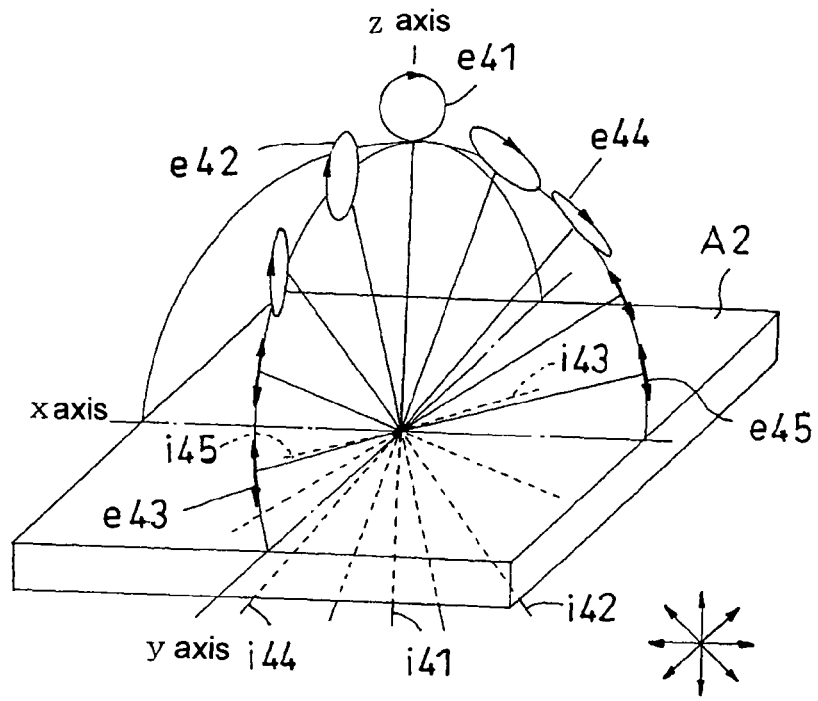
[FIG. 2(B)]
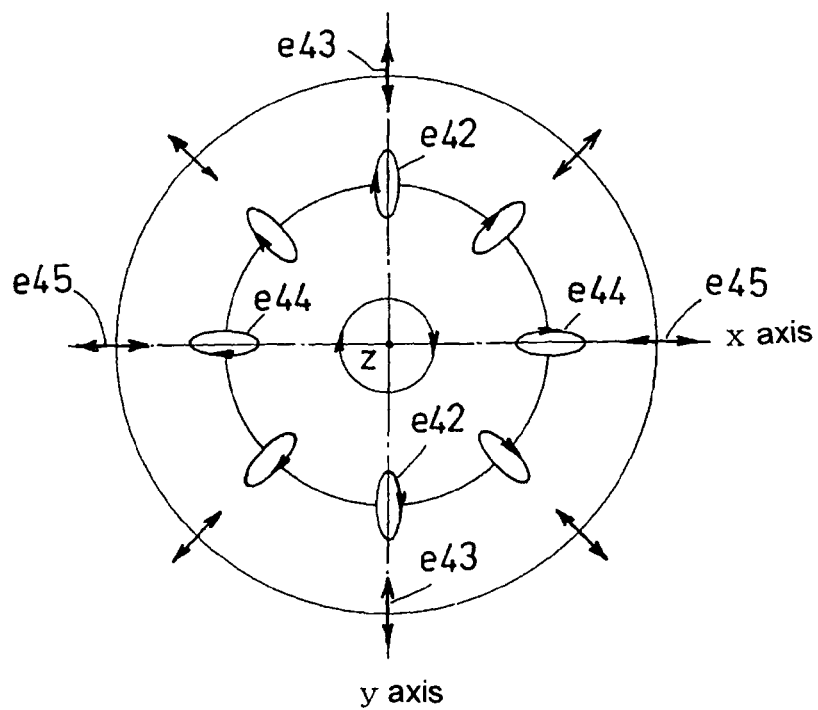

[FIG. 3]
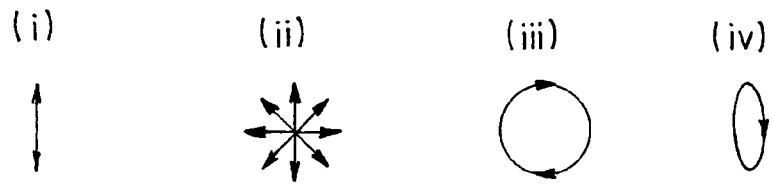
[FIG. 4]
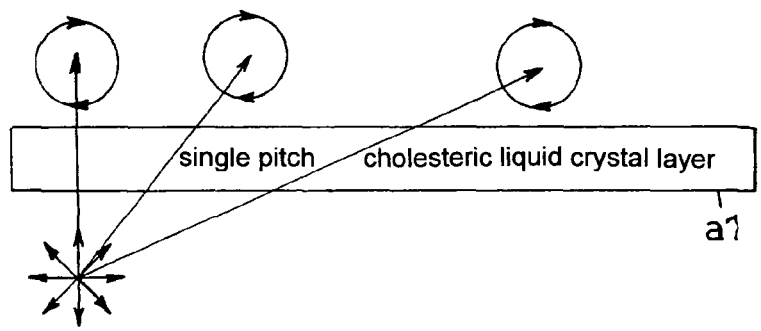
[FIG. 5]
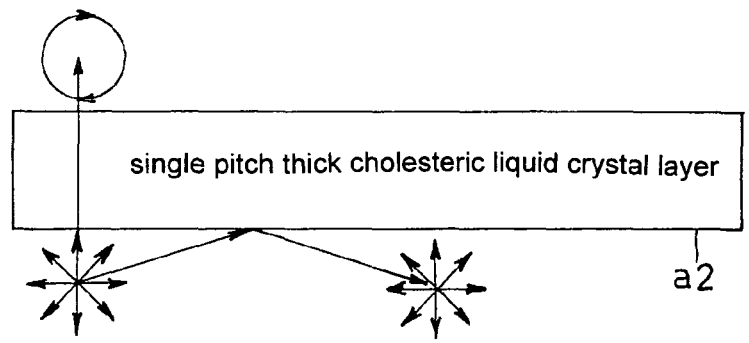
[FIG. 6]
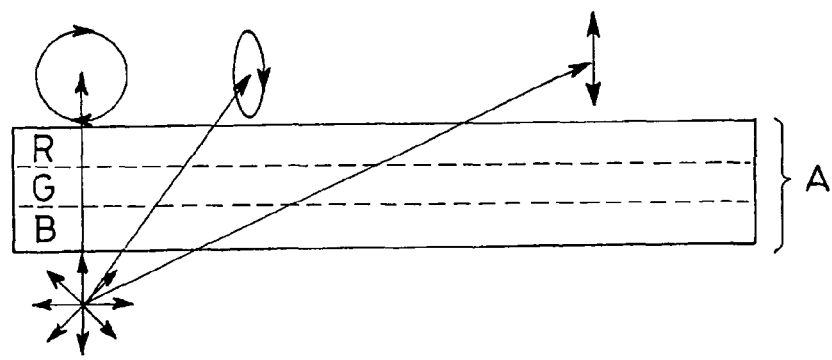

[FIG. 7]
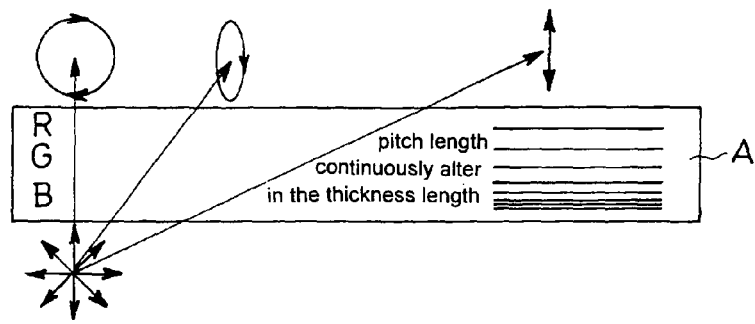
[FIG. 8(A)]
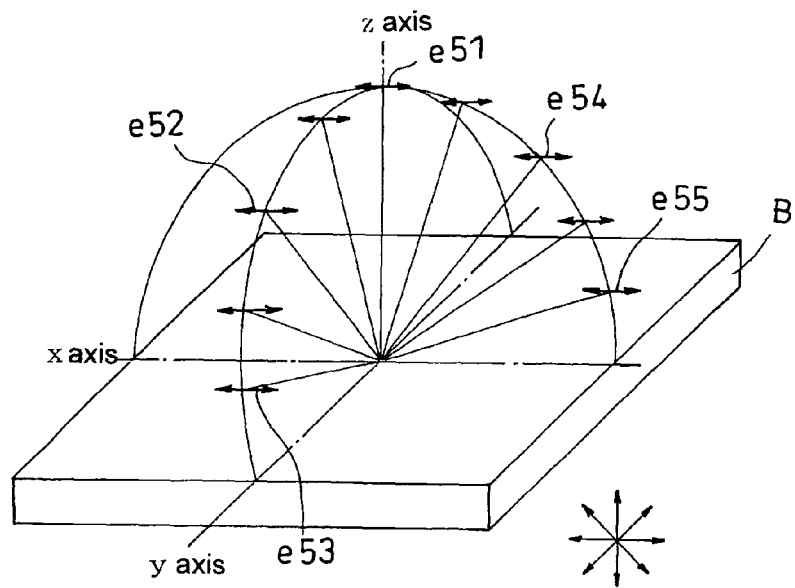

[FIG. 8(B)]
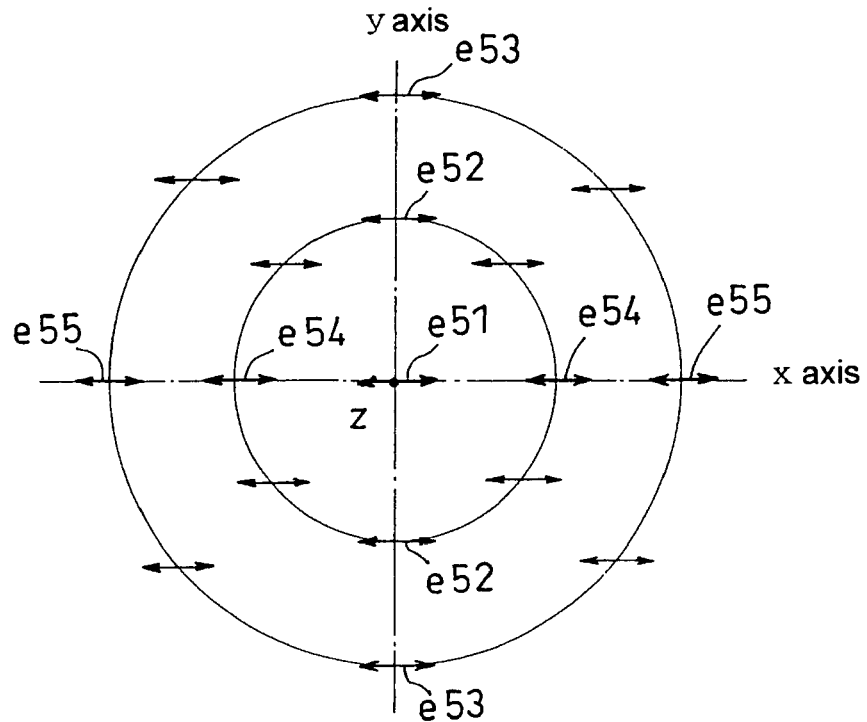
[FIG. 9]
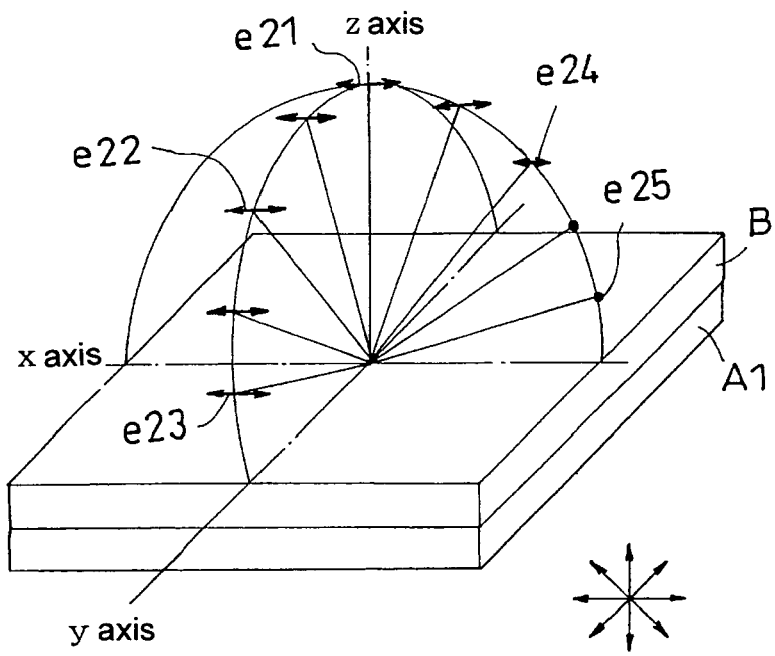

[FIG. 10]
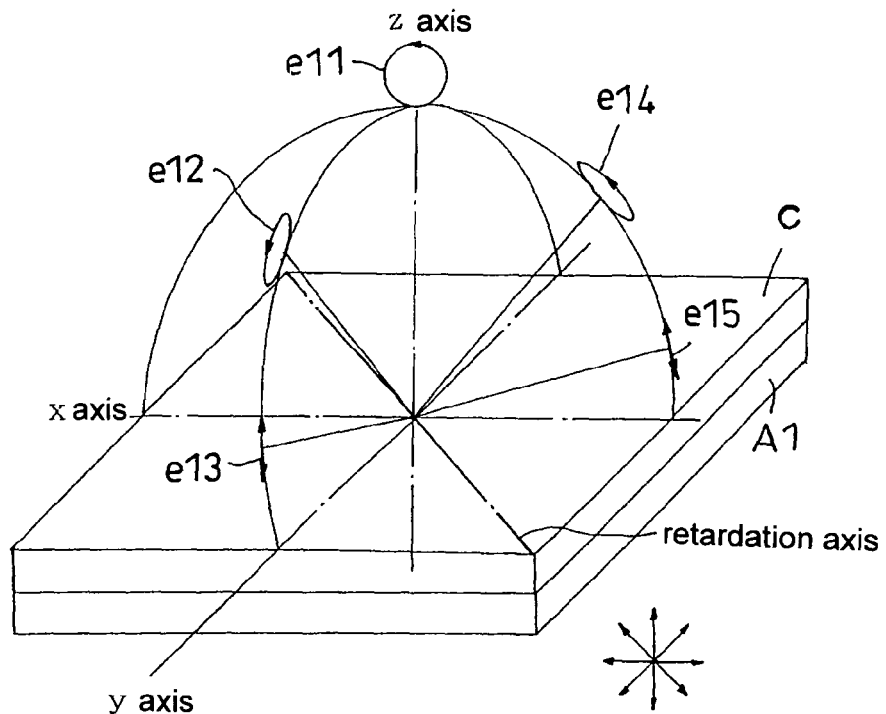
[FIG. 11]
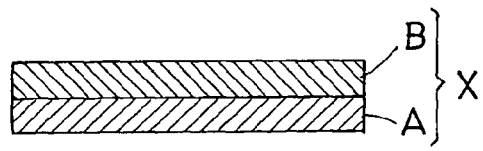
[FIG. 12]
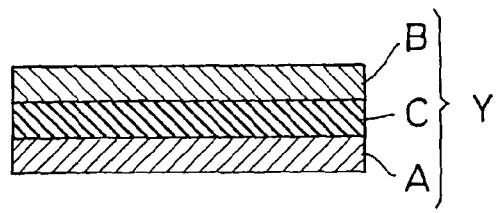
[FIG. 13]
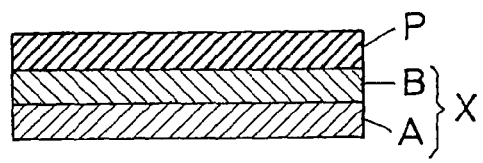

[FIG. 14]
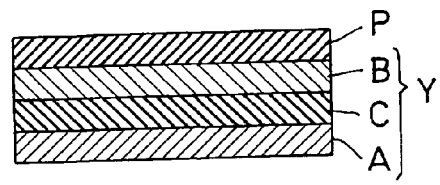
[FIG. 15]
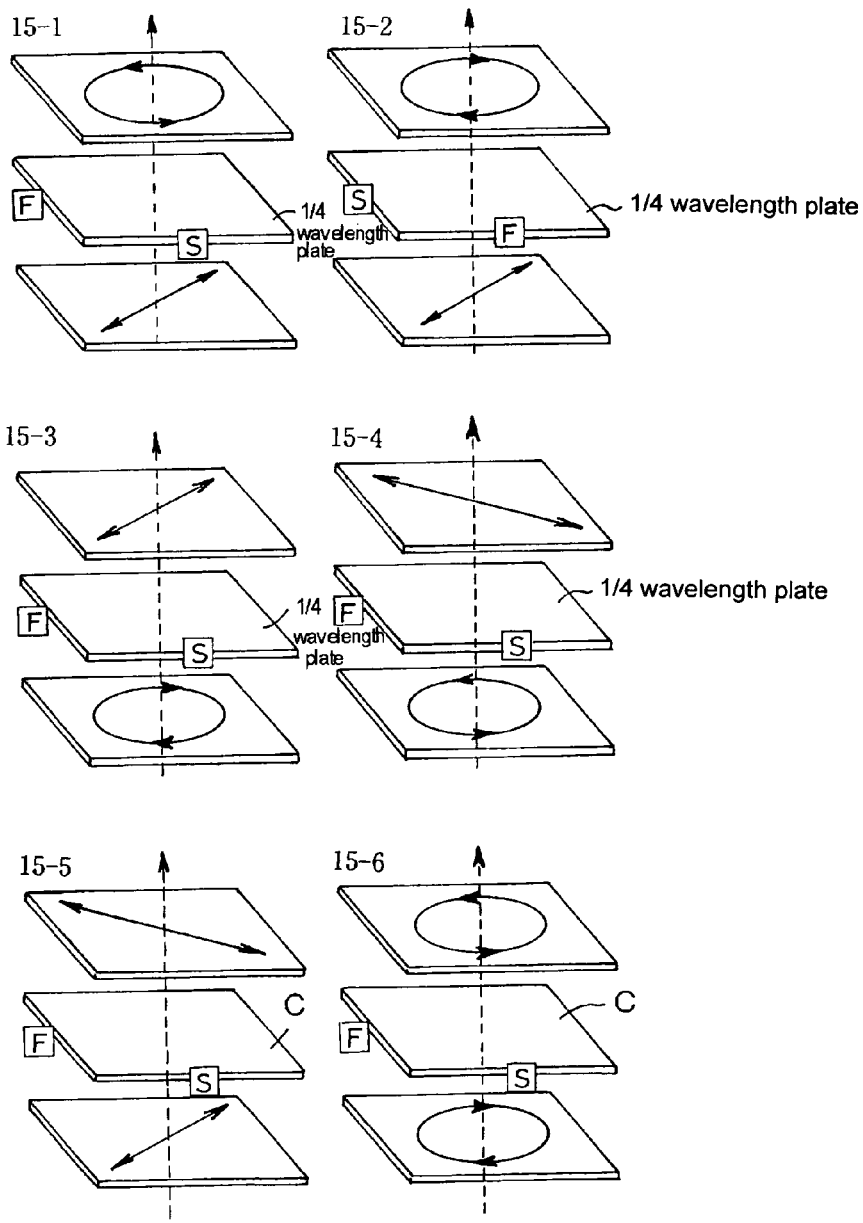

[FIG. 16]
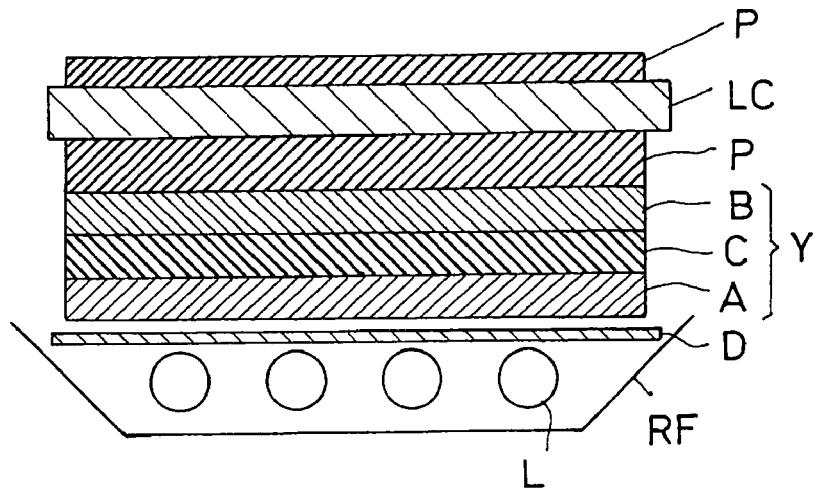
[FIG. 17]
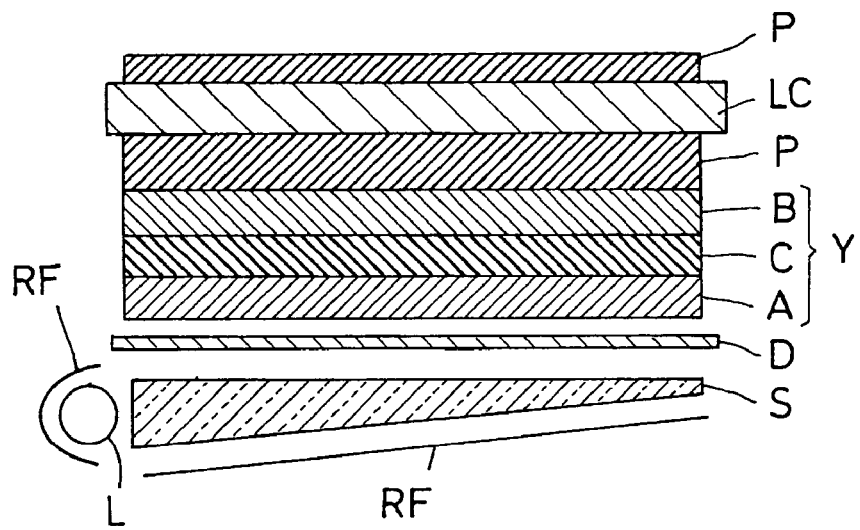
[FIG. 18]
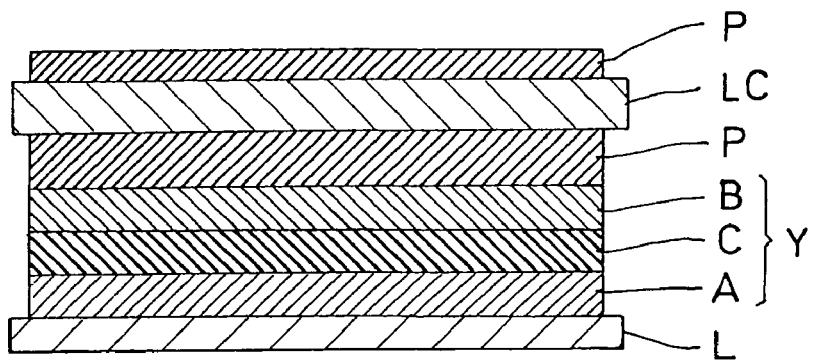

[FIG. 19]
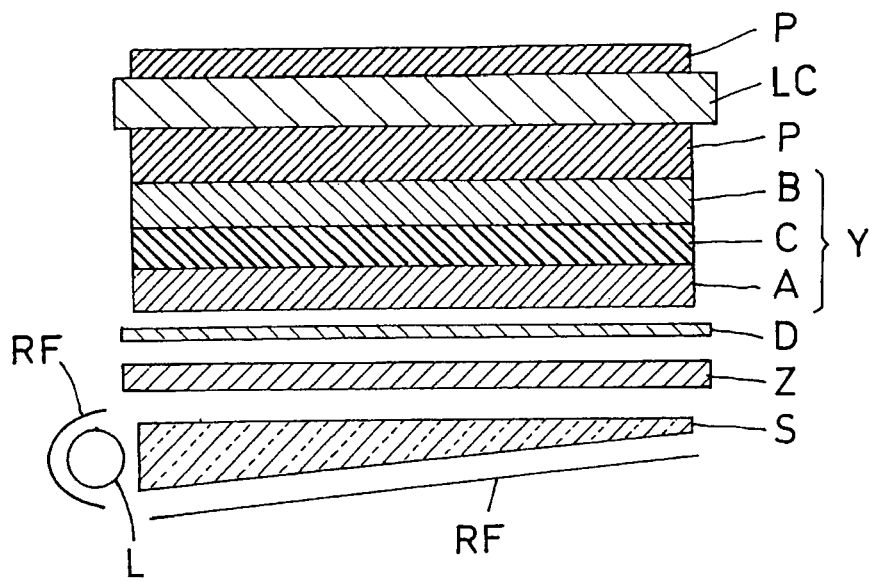
[FIG. 20]
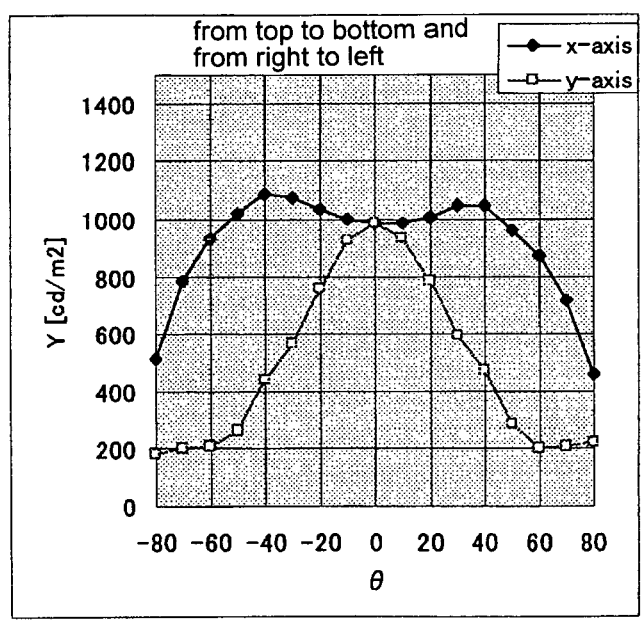

[FIG. 21]
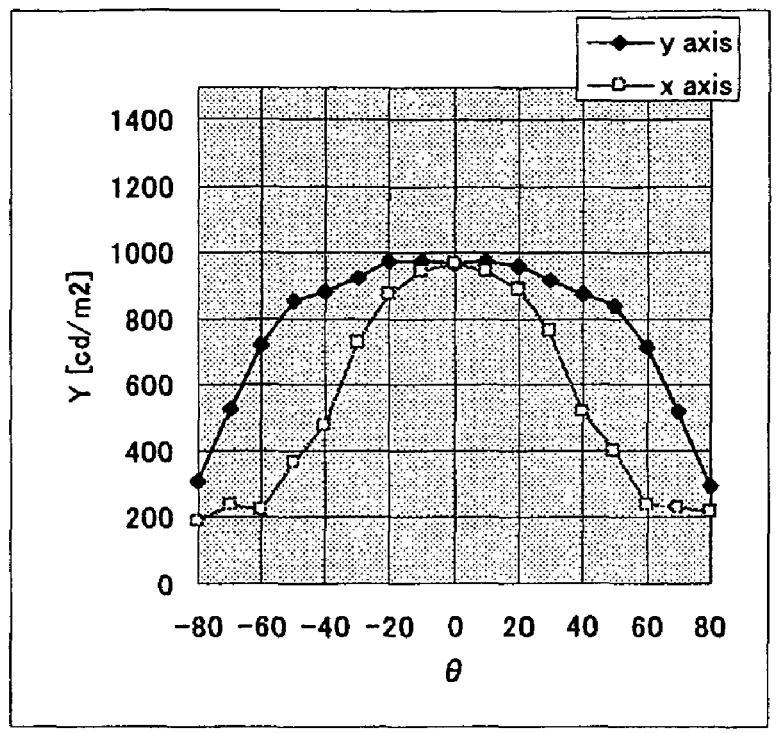
[FIG. 22]
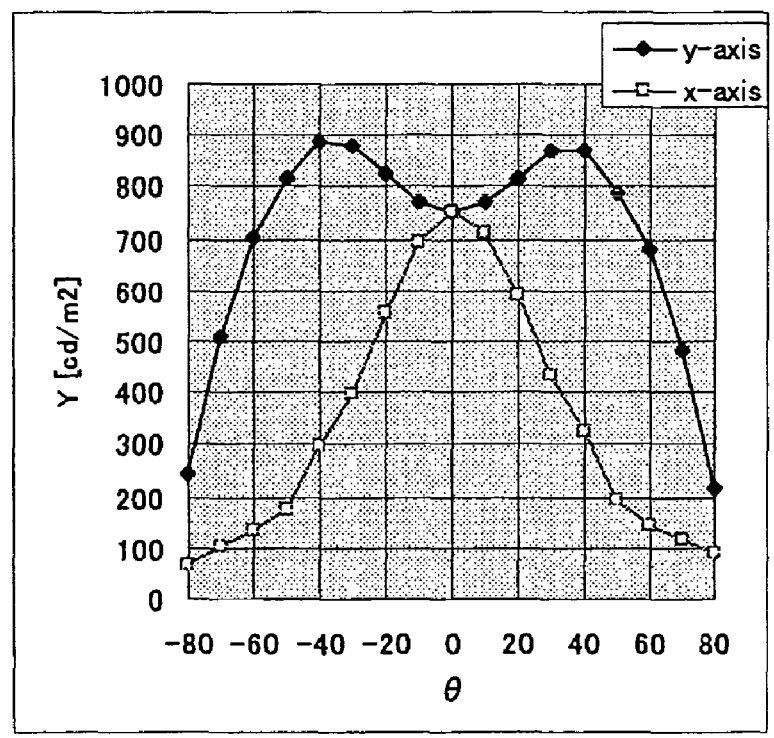

[FIG. 23]
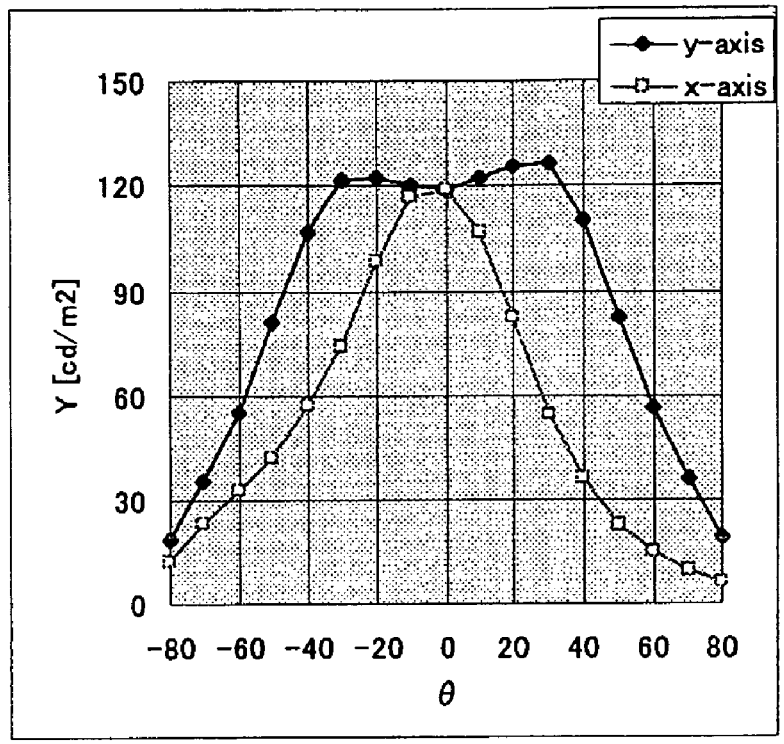
[FIG. 24]
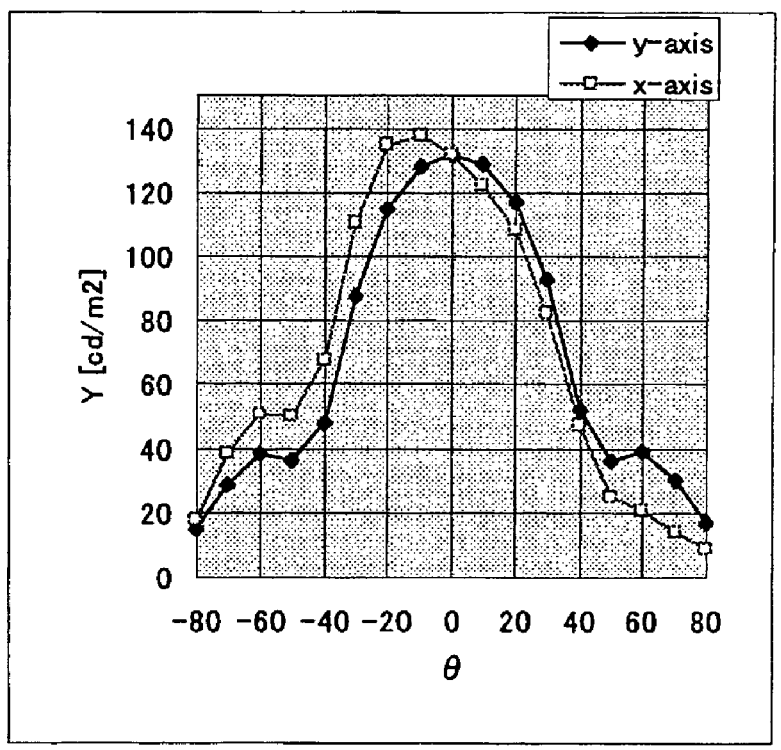

[FIG. 25]
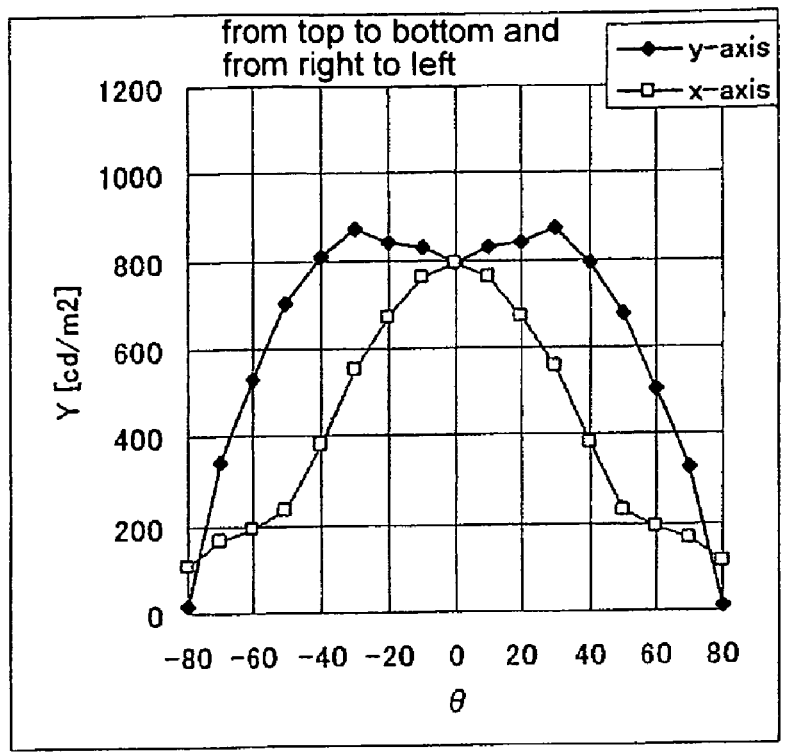
[FIG. 26]
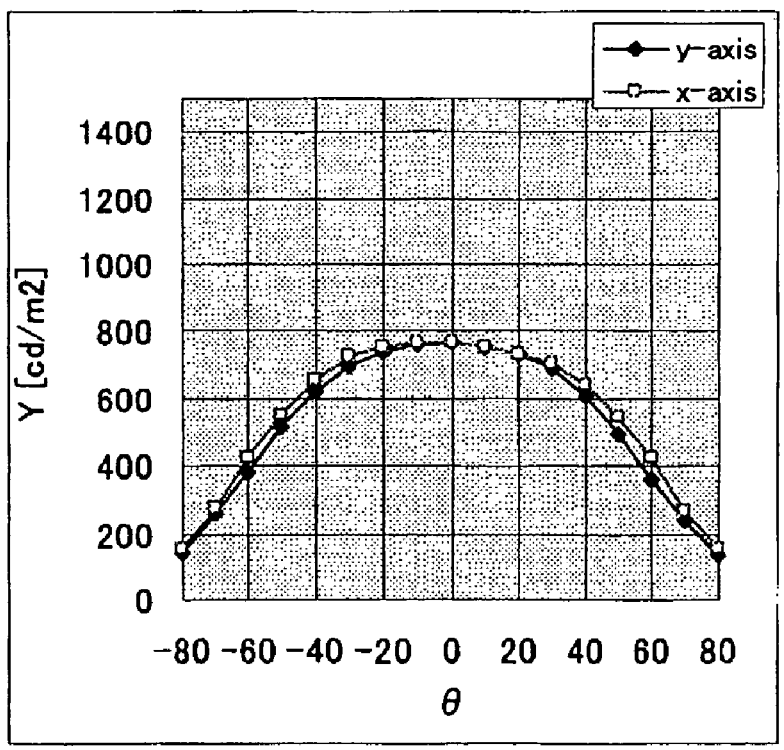

[FIG. 27]
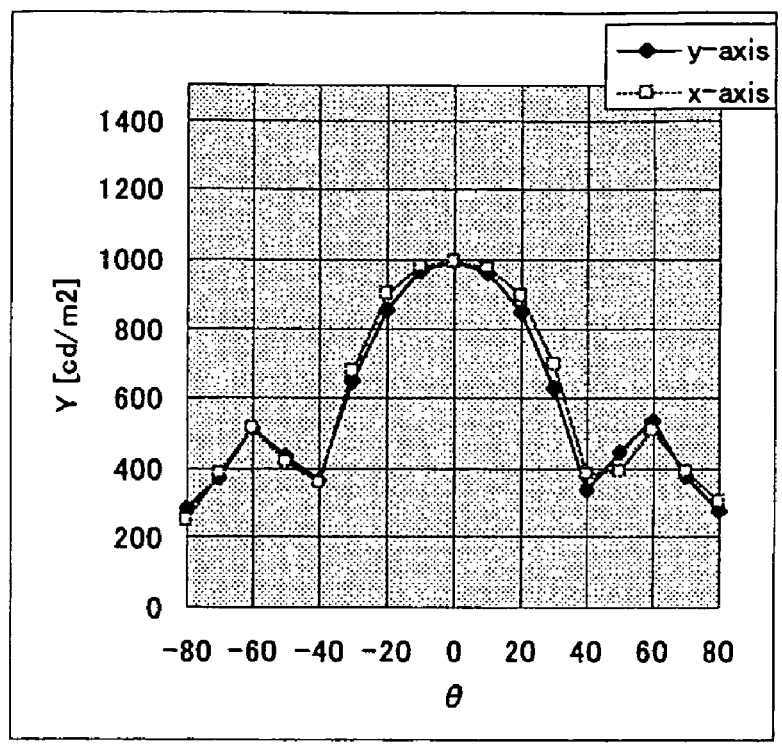
[FIG. 28]
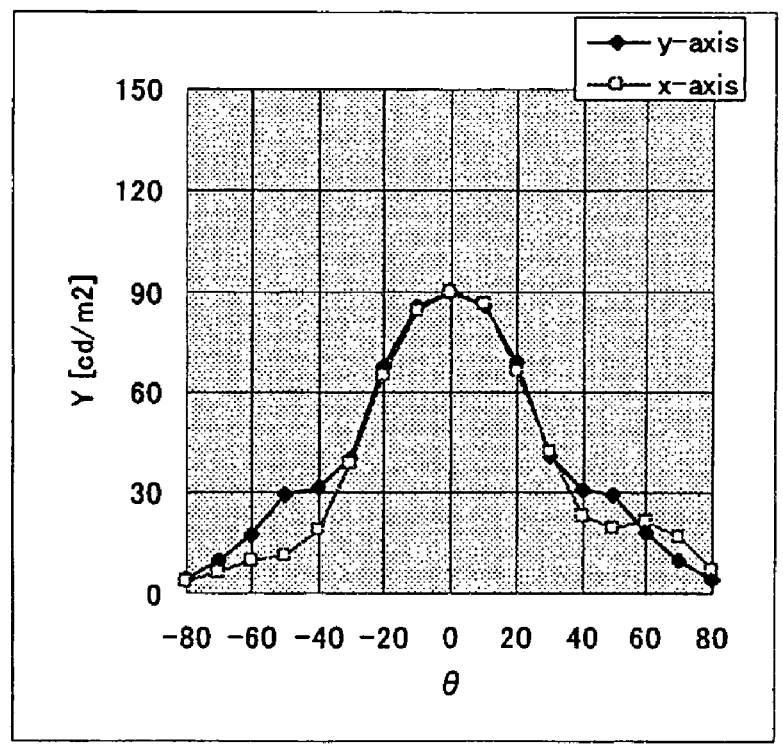

OPTICAL ELEMENT, LIGHT CONDENSATION BACKLIGHT SYSTEM, AND LIQUID CRYSTAL DISPLAY

TECHNICAL FIELD

The present invention relates to an optical element using a polarizing element. This invention further relates to a light condensation backlight system using the optical element and still further to a liquid crystal display using the same.

BACKGROUND ART

There has been conventionally conducted a trial to condense or collimate light from a diffusion light source using an optical film having a flat front surface or to control a transmittance of light therefrom in a specific direction of the optical film having a flat front surface. A typical example of such a trial is a method in which a bright line light source is combined with a band pass filter (see, for example, a publication of JP-A No. 6-235900, a publication of JP-A No. 2-158289, a publication of JP-A No. 10-321025, a specification of USP 6307604, a specification of DE 3836955 A, a specification of DE 4222028 A, a specification of EP 578302 A, a specification of US 2002/34009 A and a pamphlet of WO 02/25687 A1). There has been proposed a method in which a band pass filter is disposed on a CRT, or a display with a light source emitting a bright line such as electroluminescence to thereby condense and collimate light; or the like (see, for example, a publication of JP-A No. 2001-521643, a publication of JP-A No. 2001-516066, a specification of US 2002/036735 A, a publication of JP-A No. 2002-90535 and a publication of JP-A No. 2002-258048).

A method has been proposed in which polarization and retardation are combined with each other or the like (see a specification of JP No. 2561483). An optical element has been proposed, in other patent literatures, that is constituted of a reflection polarizer-a roratory polarization plate-a reflection polarizer (see a specification of U.S. Pat. No. 4,984,872, a specification of US 2003/63236 A and a pamphlet of WO 03/27731 A1). An optical element has been proposed that uses a hologram material (see a pamphlet of WO 03/27756 A1).

In a method in which a bright line spectrum is used as an optical film imparting directivity to a diffusion light source, however, since a requirement is a high precision level related to wavelength matching between a kind of a light source and a band pass filter, which has made fabrication thereof difficult. On the other hand, no large problem occurs in a case where a monochromatic light is used, whereas in a case where adaptation is required for the three primary colors, coloration is felt unless transmittance of the colors changes at the same ratio according an incidence angle. Therefore, in combination of a bright line light source and a band pass filter, a requirement is a precise matching of a wavelength of the light source with a band pass filter, which is high in technical difficulty.

For example, in the publications of JP-A 2002-90535 and JP-A 2002-258048, used for light condensation in the front direction is a reflecting plate obtained by combining a left circularly polarized light separating plate and a right circularly polarized light separating plate together or alternatively a reflecting plate obtained by inserting a ½ wavelength plate between circularly polarized light separating plates with the same direction of the rotation. In this system, a necessity arises for forming corresponding layers for respective wavelengths of a light source, which necessitates lamination of three sets for color display. This has led to complexity in construction and a high cost.

In a case where polarization and retardation are used, there has arisen a tendency that a secondary transmission region emerges at a further larger incidence angle if an emittable angle range is narrowed.

In a case where obliquely incident light passes through a retardation plate, there is generally a tendency that an optical path length is longer; and with an increase in optical path length, a difference in optical path length also increases. With combination of this characteristic and a polarizer adopted, it is possible to fabricate a polarizing element having angular dependency of transmittance as taught in the specification of JP-2561483. Such a polarizing element can change a transmittance according to an incidence angle. For example, with such a polarizing element, it is possible that a transmittance in the front direction is higher, while a transmittance of an obliquely incident light is lower.

If a layer imparting no retardation in the front direction and a retardation of ½ wavelength in an oblique direction is inserted between optical elements separating circularly polarized light in the same direction of the rotation, light is totally reflected in an oblique direction; therefore, light is transmitted only in the front direction (see Publication of JP-A No. 10-321025). In this method, however, in a case where a condition that total reflection occurs at a specific angle is set, a problem has been remained that a transmission region emerges at an incidence angle larger than the specific angle. With increase in incidence angle, the length of an optical path is longer and an imparted retardation increases. Hence, a property emerges that light is again transmitted at an incidence angle that imparts a retardation of a ¾ wavelength. Therefore, if a transmission characteristic is confined only in the front direction, a transmission component is, to the contrary, generated in an oblique direction, which has become a trouble.

The specification of US 2003/63236 A and the pamphlets of WO 03/27731 A1 and WO 03/27756 A1 all improve a productivity of reflection polarizer laminates for use in transflective by enabling a production according to a roll-to-roll method by use of a rotatory polarizer, as solution of a problem of reduction in productivity and decrease in area yield which have been caused by fabricating the reflection polarizer laminates through lamination having a small displacement in angular registration. In such a general combination of a reflection polarizer-a rotatory plate-a reflection polarizer, there has been no chance that an angular dependency of a transmittance occurs. In a general polarizer using a laminate of a chiral material and a retardation plate such as quartz crystal and saccharose, it is difficult to fabricate the rotatory polarizer, while intentionally controlling a retardation plate having a rotatory polarization characteristic changed by an incidence angle. A TN liquid crystal layer works as a rotatory plate, no phenomenon has been observed that an optical rotation angle varies according to an incident angle, working as an optical rotator of about 90 degrees in a direction of oblique incidence in a similar way to that in the front direction.

On the other hand, hologram materials are, in more of cases, expensive, poor in mechanical characteristics, and soft and weak in nature, which have been problematic about long term durability.

As discussed above, conventional optical elements have been problematic because of difficulty in fabrication, hardness in obtaining a target optical characteristic, poor reliability and the like.

DISCLOSURE OF INVENTION

The invention is directed to an optical element capable of condensation and collimation of incident light from a light source and it is an object of the invention to provide an optical element capable of suppressing transmission of light in an arbitrary direction.

It is still another object of the present invention to provide a light condensation backlight system using the optical element and in addition, a liquid crystal display.

The present inventors have conducted serious studies in order to solve the tasks with the resulted findings of the optical element described below, which has led to completion of this invention. That is, the present invention is as follows:

1. An optical element comprising:
a polarizing element (A), separating incident light into polarization to then emit light, and made of a cholesteric liquid crystal, and
a linearly polarized light reflection polarizer (B) transmitting linearly polarized light with one polarization axis and selectively reflecting linearly polarized light with the other polarization axis perpendicular to the one polarization axis, wherein
the polarizing element (A) has a distortion rate with respect to emitting light to incident light in the normal direction of 0.5 or more and
a distortion rate with respect to emitting light to incident light at an angle inclined from the normal direction by 60 degrees or more of 0.2 or less,
the polarizing element (A) has a function increasing a linearly polarized light component of emitting light as incidence angle is larger.

2. The optical element according to the above-mentioned 1, wherein, in the polarizing element (A), the linearly polarized light component of emitting light increasing as incidence angle is larger has a polarization axis of linearly polarized light substantially perpendicular to the normal direction of a surface of the polarizing element.

3. The optical element according to the above-mentioned 1, wherein, in the polarizing element (A), the linearly polarized light component of emitting light increasing as incidence angle is larger has a polarization axis of linearly polarized light substantially parallel to the normal direction of a surface of the polarizing element.

4. The optical element according to any one of the above-mentioned 1 to 3, wherein the polarizing element (A) substantially reflects a non-transmission component of incident light.

5. The optical element according to any one of the above-mentioned 1 to 4, wherein a thickness of the polarizing element (A) is 2 μm or more.

6. The optical element according to any one of the above-mentioned 1 to 5, wherein a reflection band width of the polarizing element (A) is 200 nm or more.

7. The optical element according to any one of the above-mentioned 1 to 6, wherein the linearly polarized light reflection polarizer (B) is a grid type polarizer.

8. The optical element according to any one of the above-mentioned 1 to 6, wherein the linearly polarized light reflection polarizer (B) is a multilayer thin film laminate with two or more layers made of two or more kinds of materials having a difference between refractive indices.

9. The optical element according to the above-mentioned 8, wherein the thin multilayer laminate is a vapor-deposited thin film.

10. The optical element according to any one of the above-mentioned 1 to 6, wherein the linearly polarized light reflection polarizer (B) is a multi-birefringence layer thin film laminate with two or more layers made of two or more kinds of materials each having a birefringence.

11. The optical element according to the above-mentioned 10, wherein the thin multilayer laminate is a stretched resin laminate with two or more layers containing two or more kinds of resins each having a birefringence.

12. An optical element comprising a ½ wavelength plate (C) sandwiched between the polarizing element (A) and the linearly polarized light reflection polarizer (B) in the optical element according to any one of the above-mentioned 1 to 11.

13. The optical element according to the above-mentioned 12, wherein the ½ wavelength plate (C) is a broad band wavelength plate working as an almost ½ wavelength plate over the entire visible light band.

14. The optical element according to the above-mentioned 13, wherein the ½ wavelength plate (C) has a front retardation values, which is expressed by $(nx-ny) \times d$, in the range of a ½ wavelength ±10% at wavelengths in the light source wavelength band (ranging from 420 to 650 nm),
where a direction in which an in-plane refractive index is maximized is defined as X axis and a direction perpendicular to the X axis is defined as Y axis, where refractive indices in each axis directions are defined as nx and ny, respectively, and a thickness is defined as d (nm).

15. The optical element according to any one of the above-mentioned 12 to 14, wherein the ½ wavelength plate (C) controls a retardation in the thickness direction and reduces a change in retardation caused by a change in angle.

16. The optical element according to the above-mentioned 15, wherein the ½ wavelength plate (C) has an Nz coefficient, which is expressed by $Nz=(nx-nz)/(nx-ny)$, in a relation of $-2.5 < Nz \leq 1$,
where a direction in which an in-plane refractive index is maximized is defined as X axis, a direction perpendicular to the X axis is defined as Y axis and a thickness direction of the film is defined as Z axis, where refractive indices in each axis directions are defined as nx, ny and nz.

17. The optical element according to any one of the above-mentioned 1 to 16, wherein a polarizing plate is disposed outside of the linearly polarized light reflection polarizer (B) so that the polarized light transmission axis of the linearly polarized light reflection polarizer (B) and the polarization axis direction of the polarizing plate coincide with each other.

18. The optical element according to any one of the above-mentioned 1 to 17, wherein layers are laminated with a transparent adhesive or pressure sensitive adhesive.

19. A light condensation backlight system, in which at least a light source is provided for the optical element according to any one of the above-mentioned 1 to 18.

20. The light condensation backlight system according to the above-mentioned 19, comprising a primary light condensing means condensing light in the angular range of ±60 degrees from the normal direction.

21. The light condensation backlight system according to the above-mentioned 20, wherein the primary light condensing means is a microprism sheet array disposed on the light source.

22. A liquid crystal display, in which at least a liquid crystal cell is provided for the light condensation backlight system according to any one of the above-mentioned 19 to 21.

23. The liquid crystal display according to the above-mentioned 22, comprising a diffusing plate neither backscattering nor depolarizing laminated on the viewing side of the liquid crystal cell.

An optical element of the invention is a combination of a polarizing element (A) separating incident light into polarization to then emit light, and made of a cholesteric liquid crystal and a linearly polarized light reflection polarizer (B) transmitting linearly polarized light with one polarization axis and selectively reflecting linearly polarized light with the other polarization axis perpendicular to the one polarization axis. In FIG. 11, there is shown an example of a sectional view of an optical element (X) of the invention. Moreover, an optical element of the invention is directed to one in which a ½ wavelength plate (C) is sandwiched between the polarizing element (A) and the linearly polarized light reflection polarizer (B). In FIG. 12, there is shown an example of a sectional view of such an optical element (Y) of the invention.

The optical elements (X) and (Y) of the invention use a unique phenomenon of the polarizing element (A). That is, the optical elements (X) and (Y) of the invention use a peculiar characteristic of the polarizing element (A) that an emitting light is linearly polarized if an incidence angle of light increases to a value, but even if an incident angle of light further increases to a larger value, the polarization axis direction of the emitting linearly polarized light does not vary and a polarization state of the emitting light is sustained unchanged, which is combined with the linearly polarized light reflection polarizer (B), further combined with the ½ wavelength plate (C), wherein emitting light is controlled so as to become a predetermined direction and a secondary transmission component is suppressed.

In the polarizing element (A) of both cases, a distortion rate with respect to emitting light to incident light in the normal direction is 0.5 or more and circularly polarized light is emitted at an angle of normally incident light or at an incidence angle close to normal incidence. Since the more a distortion rate with respect to emitting light to incident light in the normal direction, the more a proportion of circularly polarized light, a distortion rate is preferably 0.7 or more and more preferably 0.9 or more. On the other hand, a distortion rate with respect to emitting light to incident light at an angle inclined from the normal direction by 60 degrees or more is 0.2 or less and emitting light from incident light at a large incidence angle is linearly polarized light. Since the less a distortion rate with respect to emitting light to incident light at an angle inclined from the normal direction by 60 degrees, the more a proportion of linearly polarized light, a distortion rate of emitting light from the incident angle is preferably 0.2 or less and more preferably 0.1 or less. In such a way, a polarizing element (A) of the invention has a feature that the more an incident angle, the more a proportion of linearly polarized light component of emitting light.

An example of the polarizing element (A) can be a polarizing element with which a linearly polarized light component of emitting light that increases as an incidence angle is larger has the polarization axis of linearly polarized light in a direction substantially perpendicular to the normal direction of a surface of the polarizing element. FIG. 1(A) is a conceptual representation showing that emitting light (e) transmitted through a polarizing element (A1), which is in an optical plane (the x axis-y axis plane), has a different polarized light component according to a difference of an incidence angle of incident light (i). FIG. 1(B) is a conceptual diagram when emitting light (e) is viewed along the z axis direction. Note that in FIG. 3, there is shown various kinds of light of linearly polarized light (i), natural light (ii), circularly polarized light (iii) and elliptically polarized light (iv).

Emitting light (e1) is emitting circularly polarized light from incident light (i1) in the z axis direction (the normal direction) to the polarizing element (A1).

Emitting light (e2) and (e4) is emitting elliptically polarized light from incident light (i2) and (i4) obliquely to the polarizing element (A1). The emitting light (e2) is present on a plane including the z axis and the y axis and is an elliptically polarized light having an axis perpendicular to the plane including the axes. The emitting light (e4) is present on the plane including the z axis and the x axis and is an elliptically polarized light having an axis perpendicular to the plane including axes.

Emitting light (e3) and (e5) is emitting linearly polarized light from incident light (i3) and (i5) obliquely to the polarizing element (A1) at a large angle. The emitting light (e3) is present on a plane including the z axis and the y axis and is a linearly polarized light having an axis perpendicular to the plane including the axes. The emitting light (e5) is present on the plane including the z axis and the x axis and is a linearly polarized light having an axis perpendicular to the plane including axes. The emitting light (e3) and (e5), which is linearly polarized light, has, in such a way, the polarization axes substantially perpendicular to the z axis, that is the polarization axes in parallel with an optical plane (the x axis-y axis plate).

An example of the polarizing element (A) can be a polarizing element with which a linearly polarized light component of emitting light which increases as an incidence angle is-larger has the polarization axis of linearly polarized light in a direction substantially parallel to the normal direction of a surface of the polarizing element. FIG. 2(A) is a conceptual representation showing that emitting light (e) transmitted through a polarizing element (A2), which is in an optical plane (the x axis-y axis plane), has a different polarized light component according to a difference of an incidence angle of incident light (i). FIG. 2(B) is a conceptual diagram when emitting light (e) is viewed along the z axis direction.

Emitting light (e41) is emitting circularly polarized light from incident light (i41) in the z axis direction (the normal direction) to the polarizing element (A2).

Emitting light (e42) and (e44) is emitting elliptically polarized light from incident light (i42) and (i44) obliquely to the polarizing element (A2). The emitting light (e42) is present on a plane including the z axis and the y axis and an elliptically polarized light having an axis parallel to the plane including the axes. The emitting light (e44) is present on the plane including the z axis and the x axis and is an elliptically polarized light having an axis parallel to the plane including axes.

Emitting light (e43) and (e45) is emitting linearly polarized light from incident light (i43) and (i45) obliquely striking the polarizing element (A2) at a large angle. The emitting light (e43) is present on a plane including the z axis and the y axis and is a linearly polarized light having an axis parallel to the plane including the axes. The emitting light (e45) is present on the plane including the z axis and the x axis and is a linearly polarized light having an axis parallel to the plane including the axes. The emitting linearly polarized light (e43) and (e45), which is a linearly polarized light, has, in such a way, the polarization axes substantially parallel to the z axis, that is the polarization axes perpendicular to a optical plane (the x axis-y axis plane).

The polarizing element (A) is formed of a cholesteric liquid crystal layer. A reflection band width of the polarizing element is preferably 200 nm or more. It has conventionally understood that circularly polarized light is transmitted through/reflected on a cholesteric liquid crystal layer regardless of an incidence angle. Refer to FIG. 4. In a conventional single pitch narrow band cholesteric liquid crystal layer (a1), emitting light actually has been circularly polarized light regardless of an incidence angle of incident light. The present invention uses a discovered phenomenon that a cholesteric liquid crystal layer having a broad band selective reflection wavelength band transmits linearly polarized light in a case where an incidence angle of incident light is large as described above. That is, the phenomenon is not observed in a single pitch cholesteric liquid crystal layer exerting a selective reflection function at a specific wavelength only, but observed only in a cholesteric liquid crystal layer having a varying pitch length covering a broad band.

Note that in the past, a report was made by TAKEZOE (Jpn. J. Appl. Phys., 22 1080 (1983)) on a phenomenon that in a case where a cholesteric liquid crystal layer large in birefringence is aligned to a thickness as large as tens of μm (a2), incident light with a large incidence angle is totally reflected without transmission. Refer to FIG. 5. In the literature, however, no description is given of the fact that incident light with a large incidence angle is linearly polarized.

A polarizing element (A) generating the above phenomenon can be obtained, for example, by laminating cholesteric liquid crystal layers having central wavelengths different from one another to thereby obtain a cholesteric liquid crystal layer having a selective reflection wavelength band covering the entire visible region. Refer to FIG. 6. In FIG. 6, there is shown a case where three layers in colors R (a red wavelength region), G (a green wavelength region) and B (a blue wavelength region) are laminated. A construction can be used in which a twist pitch length of a cholesteric liquid crystal layer varies along the thickness direction to thereby render a band broader. Refer to FIG. 7. A polarizing element exerting the above phenomenon, in such a way, may be a laminate of plural cholesteric liquid crystal layers, as shown in FIG. 6, having selective reflection wavelength bands different from one another and can also be a cholesteric liquid crystal layer in which a pitch length, as shown in FIG. 7, continuously alters in the thickness length, both of which exhibit similar effects.

The reason for generation of the phenomenon is not clear. Even a single pitch cholesteric liquid crystal layer must create linearly polarized light from light with a specific wavelength in a case where a separating light into polarization is affected simply by using a Brewster's angle at interfaces between liquid crystal layers. Since there is no difference between a laminate of cholesteric liquid crystal layers and a cholesteric liquid crystal layer in which a pitch length is continuously alters in the thickness direction, the phenomenon is not a reflection effect at interfaces of the laminate either. Therefore, the phenomenon is, it is thought, that circularly polarized light separated when light is transmitted through a cholesteric liquid crystal layer is imparted a retardation in the next cholesteric liquid crystal layer having a wavelength band different from the former and is thereby converted to linearly polarized light.

In order to effectively generate the phenomenon to work, a selective reflection band width is necessary to be sufficiently broad and desirably 200 nm or more, more desirably 300 nm or more and further more desirably 400 nm or more. In order to cover the visible light region, it is necessary to cover, to be concrete, the range of from 400 to 600 nm in wavelength. Note that since a selective reflection wavelength shifts to the shorter wavelength side so as to be adapted for an incidence angle, it is desirable to extend a selective selection wavelength band to the longer wavelength side thereof in order to cover the visible light region independently of an incidence angle, to which limitation is not necessarily imposed on.

In order to generate the phenomenon that a polarizing element of the invention effectively works, a cholesteric liquid crystal layer is preferably sufficiently thick. In a case of a single pitch cholesteric liquid crystal layer, a thickness thereof generally can give a sufficiently selective reflection with a value of the order of a few pitches (twice or thrice times as long as the central wavelength of selective reflection). With a central wavelength of selective reflection in the range of 400 to 600 nm adopted, a thickness thereof on the order in the range of from 1 to 1.5 μm works as a polarizing element due to a refractive index of a cholesteric liquid crystal. Since a cholesteric liquid crystal used in a polarizing element of the invention has a broad reflection band, a thickness thereof is preferably 2 μm or more. A thickness thereof is more preferably 4 μm or more and further more preferably 6 μm or more.

In order to obtain a polarizing element (A), it is preferable to use such a broad band cholesteric liquid crystal that a selective reflection band thereof covers the visible light band. This is because a broad band cholesteric liquid crystal layer is thick enough to thereby enable a retardation to be imparted effectively.

A polarizing element (A) obtains circularly polarized light from incident light in the front direction (the normal direction) and emits linearly polarized light in a direction perpendicular to or parallel to the normal from incident light at a large incidence angle. Therefore, sufficient extension of a selective reflection wavelength band to the longer wavelength side renders a reflectance in the visible light band unchanged and enables the polarizing element (A) to work so that an image is visually recognized as in a mirror surface reflective member without a change in tone.

On the other hand, the linearly polarized light reflection polarizer (B) transmits linearly polarized light with one polarization axis and selectively reflecting a linearly polarized light with the other polarization axis perpendicular to the one polarization axis. FIG. 8(A) is a conceptual representation showing that emitting light (e) transmitted through a linearly polarized light reflection polarizer (B), which is in an optical plane (the x axis-y axis plane), is emitted as linearly polarized light in the same direction regardless of an incidence angle of incident light (i). FIG. 8(B) is a conceptual representation in a case where emitting light (e) is viewed along the z axis direction. Note that in FIG. 8, there is shown no incident light (i). Linearly polarized light having the polarization axis perpendicular to the emitting light (e) is reflected thereon.

An optical element (X) of the invention is, as shown in FIG. 11, formed by laminating a polarizer (A) and a linearly polarized light reflection polarizer (B) in the order and incident light is transmitted through the optical element (X) in the order of polarizers. In FIG. 9, there is shown emitting light transmitted the polarizer (A) and the linearly polarized light reflection polarizer (B) in the order. FIG. 9 is a case where a polarizer (A1) is used as the polarizer (A).

Emitting light (e21) is present on the z axis. Circularly polarized light (e1) normally transmitted through the polarizing element (A1) is further transmitted through the linearly polarized light reflection polarizer (B) to be converted to a linearly polarized light. A half of the circularly polarized light (e1) is transmitted therethrough and the other half is reflected thereon.

Emitting light (e22) is present on a plane including the z axis and the y axis. The axis of elliptically polarized light (e2) transmitted through the polarizing element (A1) is parallel to the transmission axis of the linearly polarized light reflection polarizer (B), and almost all the emitting light (e22) transmit as linearly polarized light.

Emitting light (e23) is present on a plane including the z axis and the y axis. The axis of the linearly polarized light (e3) transmitted through the polarizing element (A1) is in the same direction as the transmission axis of the linearly polarized light reflection polarizer (B), and the emitting light (e23) transmits as a linearly polarized light.

Emitting light (e24) is present on a plane including the z axis and the y axis. The axis of elliptically polarized light (e4) transmitted through the polarizing element (A1) is perpendicular to the transmission axis of the linearly polarized light reflection polarizer (B) and almost all the emitting light (e24) is reflected and some thereof is transmitted as linearly polarized light.

Emitting light (e25) is present on a plane including the z axis and the x axis. The axis of the linearly polarized light (e5) transmitted through the polarizing element (A1) is perpendicular to the transmission axis of the linearly polarized light reflection polarizer (B) and all the emitting light (e25) is reflected thereon without transmission.

In FIG. 9, there is exemplified a case where the polarizing element (A1) is employed as the polarizing element (A), while in a case where the polarizing element (A2) is employed as the polarizing element (A), emitting light can be obtained in a state as a reversal of that in the relationship of the x axis and the y axis in FIG. 9.

Light incident in the normal direction of the optical element (X) as described above is altered to circularly polarized light in the polarizing element (A) and only light having the axis coinciding with linearly polarized light transmission axis of the linearly polarized light reflection polarizer (B) is transmitted therethrough, while light not having such an axis is reflected thereon. On the other hand, in an oblique direction, a state of emitting light is different according to an azimuth. Since in FIG. 1(B), linearly polarized light transmission axes of the polarizing element (A1) and the linearly polarized light reflection polarizer (B) coincide with each other in the x axis azimuth, incident light is transmitted through the optical element (X). On the other hand, since linearly polarized light transmission axes of the polarizing element (A1) and the linearly polarized light reflection polarizer (B) are perpendicular to each other in the y axis azimuth, incident light is not transmitted through the optical element (X) with total reflection. Therefore, in the front, the original light quantity of light is halved in the polarizing element (A1) and the half quantity of transmitted light is again halved in the linearly polarized light reflection polarizer (B). However, if polarization degrees of the polarizing element (A1) and the linearly polarized light reflection polarizer (B) are sufficiently high, an absorption loss or the like is small to thereby achieve a highly efficient optical element with a transmittance angle dependence by retro reflection of reflected light with a backlight or the like disposed on the lower side thereof. An optical element (X) of the invention is a transmittance angle dependent optical element low in absorption due to a function of separating light into polarization caused by selective reflection using a cholesteric liquid crystal.

Since an optical element (X) obtains linearly polarized light as emitting light, a function of compatiblility of improvement on brightness with light collimation is achieved by installing the optical element (X) on the light source side of a liquid crystal display. Besides, since no absorption loss exists by nature, light beams at angles at which no light beam incident a liquid display are totally reflected to the light source to thereby recycle light. This is because light emitted from the light source in an oblique direction has no outlet except in the front direction to thereby effect substantial condensation of light.

An optical element (X) of the invention has a light condensing characteristic capable of reflecting light only at an arbitrary azimuth to thereby condense light at a necessary azimuth angle including the front. To be concrete, in a notebook personal computer having a liquid crystal display as an indispensable constituent, since light directed in a top and bottom direction is not necessary but only light directed in a lateral direction is necessary, an optical element (X) of the invention can be preferably used.

On the other hand, an optical element (Y) of the invention has a construction in which, as shown in FIG. 12, a polarizer (A), a ½ wavelength plate (C) and a linearly polarized light reflection polarizer (B) are laminated in the order. In the optical element (Y), incident light is transmitted in the order therethrough. Description will be given of a case where emitting light transmitted through the polarizing element (A) and the ½ wavelength plate (C) in the order is applied to a polarizer (A1) used as the polarizer (A).

Note that in FIG. 15, there is shown conceptual representations in each of which polarized light alters by the action of a wavelength plate. A symbol F indicates a fast axis and a symbol S indicates a slow axis. FIGS. 15-1 and 15-2 shows conversion from linearly polarized light to circularly polarized light using a ¼ wavelength plate. FIGS. 15-3 and 15-4 shows conversion from circularly polarized light to linearly polarized light using a ¼ wavelength plate. FIGS. 15-5 and 15-6 shows conversion in an axis direction or a sense of rotation using a ½ wavelength plate.

Emitting light beams from a polarizing plate (A1) are as in ways shown in FIG. 1. When emitting light transmitted through the polarizing element (A1) is transmitted through the ½ wavelength plate (C), as shown in FIG. 10 circularly polarized light in the front direction (the normal direction) is circularly polarized light with a reversed sense of rotation and a linearly polarized light transmitted in an oblique direction rotates the polarization axis direction by 90 degrees (see FIGS. 15-5 and 15-6).

Emitting light (e11) is present on the z axis. The emitting light (e11) corresponds to the emitting light (e1) normally transmitted through the polarizing element (A1). The emitting light (e11) is circularly polarized light affected by a retardation in the ½ wavelength plate (C) and thereby, a sense of rotation thereof is reversal of the sense of rotation of the emitting light (e1).

Emitting light (e12) is light obtained after the emitting light (e2) is affected by a retardation of the ½ wavelength plate (C) and an axis angle is rotated by 90 degrees. The emitting light (e12) is elliptically polarized light having the axis parallel to the plane including the z axis and the y axis.

Emitting light (e13) is light obtained after the emitting light (e3) is affected by a retardation of the ½ wavelength plate (C) and an axis angle is rotated by 90 degrees. The emitting light (e13) is linearly polarized light having an axis parallel to the plane including the z axis and the y axis.

Emitting light (e14) is light obtained after the emitting light (e4) is affected by a retardation of the ½ wavelength plate (C) and an axis angle is rotated by 90 degrees. The emitting light (e14) is elliptically polarized light having an axis parallel to the plane including the z axis and the x axis.

Emitting light (e15) is light obtained after the emitting light (e5) is affected by a retardation of the ½ wavelength plate (C) and an axis angle is rotated by 90 degrees. The emitting light (e15) is linearly polarized light having an axis parallel to the plane including the z axis and the x axis.

Emitting light, shown in FIG. 10, transmitted through the polarizing element (A) and the ½ wavelength plate (C) has the same polarization axis of linearly polarized light as the emitting light transmitted through the polarizing element (A2) shown in FIG. 2, but senses of rotation of circularly and elliptically polarized light are reversal of those of the emitting light of the polarizing element (A2). Therefore, in the optical element (X), a linearly polarized light reflection polarizer (B) is laminated on the ½ wavelength plate (C) and thereby emitting light similar to that in the case where the polarizing element (A2) is employed as the polarizing element (A) can be obtained. That is, the linearly polarized light transmission axes of the polarizing element (A) and the linearly polarized light reflection polarizer (B) are, in an oblique direction, perpendicular to each other at an azimuth different from that described in connection with the optical element (X), and light is totally reflected at this azimuth without transmitting the optical element (Y). The azimuth can be controlled by arrangement of the stretch axis of the ½ wavelength plate (C) and the polarized light transmission axis of linearly polarized light reflection polarizer (B). With the ½ wavelength plate (C) used in the optical element (Y) in such a way, the optical element (Y) has an effect that an azimuth in which direction emitting light beams are condensed can be arbitrarily controlled in addition to the effect of the optical element (X).

To be concrete, when an angle formed between the transmission axis of linearly polarized light reflection polarizer (B) and the stretch axis of the ½ wavelength plate (C) is indicated with (θ), if θ=0 degree, the axis in which light is condensed is the reflection axis azimuth of the linearly polarized light reflection polarizer (B). If θ=45 degrees, the axis in which light is condensed is the transmission axis of the linearly polarized light reflection polarizer (B). If 0 degree<θ<90 degrees, the axis in which light is condensed is an angle between the reflection axis of the linearly polarized light reflection polarizer (B) and the transmission axis of the linearly polarized light reflection polarizer (B).

In a case of application to a liquid crystal display of a general notebook personal computer, the polarized light transmission axis of the linearly polarized light reflection polarizer (B) is required to be arranged at an angle of 45 degrees relative to a direction from left to right on a liquid crystal display. Arrangement suitable for the condition is θ=22.5 degrees, in which light is efficiently reflected in a direction from top to bottom of a display.

Generally, it is possible to condense light beams in all directions into the front direction by disposing a prism sheet on a surface light source. A laminate of two kinds of prism sheets has been conventionally used in more of cases, wherein a longitudinal prism sheet, as one, for condensing light beams in lateral directions (from left to light) into the front and a lateral prism sheet, as the other, for condensing light beams in longitudinal directions (from top to bottom) into the front. According to the invention, the two prism sheets can be removed or only one thereof can be used.

According to the invention, a characteristic that have been unable to be acquired from a conventional optical element can be easily realized. The use of an optical element of the invention makes it possible to obtain an optical element having a high transmittance in the front direction and a good shielding direction effect in an oblique direction, and having no absorption loss together with a selective reflection characteristic of a cholesteric liquid crystal. Precise adjustment on secondary transmission in an oblique direction and a wavelength characteristic is unnecessary to thereby enable a stable performance to be attained.

Since an optical element of the present invention does not require an air interface, which is dissimilar to cases of a conventional lens sheet or a prism sheet, it can be used as a laminate in single piece obtained by adhering itself to a polarizing plate, and is also useful in handleability. A great effect is exerted in realizing a thin type. Since the optical element has no regularity structure visually recognizable as in a prism structure, a moire or the like is hard to occur and has advantages in removal of a diffusing plate or the like decreasing a total light transmittance, or realization of low haze (a total light transmittance is generally increased) with ease. It is naturally not problematical to use the optical element together with a prism sheet or the like. For example, a steep condensation on to the front is performed with a prism sheet or the like, wherein a secondary transmission peak caused by the prism sheet at a large emission angle can be preferably shielded with an optical element of this invention used in combination.

In a conventional backlight device using only a prism sheet, a direction of emission light peak has a tendency that the direction of emission light peak moves away from a light source cold cathode fluorescent lamp. This is because more of light emitted from a light guide plate in an oblique direction is emitted in a direction moving away from the light source cold cathode fluorescent lamp and it is difficult to position peak intensity in the normal direction to the screen. In contrast thereto, by using an optical element according to the present invention, an emission peak is enabled to coincide with the front direction with ease.

A combination of a light condensation backlight source using the optical element and a diffusing plate low in back-scattering and generating no cancellation of polarization enables construction of a viewing angle magnification system to be built.

A light condensation backlight system using the optical element having been obtained in this way easily provides a light source higher in light collimation as compared with a conventional practice. Since, in addition, light collimation due to reflective polarization essentially having no absorption loss can be obtained, a reflected non-collimated light component is returned back to the backlight side and recycling during which only a collimated light component is extracted by scattering reflection is repeated, thereby enabling substantially high transmittance and substantially high light utilization efficiency to be obtained.

BRIEF DESCRIPTION OF DRAWINGS

FIG. 1(A) is a conceptual representation showing the polarization axis directions of emitting light beams transmitted through a polarizing element (A1).

FIG. 1(B) is a conceptual representation showing the polarization axes of emitting light beams when FIG. 1(A) is viewed along the normal direction of the polarizing element (A1).

FIG. 2(A) is a conceptual representation showing the polarization axis directions of emitting light beams transmitted through a polarizing element (A2).

FIG. 2(B) is a conceptual representation showing the polarization axes of emitting light beams when FIG. 2(A) is viewed along the normal direction of the polarizing element (A2).

FIG. 3 is conceptual diagrams describing polarized light components and others.

FIG. 4 is a conceptual representation showing separating light into polarization with a conventional cholesteric liquid crystal layer.

FIG. 5 is a conceptual representation showing separating light into polarization with a conventional cholesteric liquid crystal layer.

FIG. 6 is a conceptual representation showing separating light into polarization with a polarizing element (A).

FIG. 7 is conceptual representation showing separating light into polarization with a polarizing element (A).

FIG. 8(A) is a conceptual representation showing the polarization axis directions of emitting light beams transmitted through a linearly polarized light reflection polarizer (B) only.

FIG. 8(B) is a conceptual representation showing the polarization axes of emitting light beams when FIG. 8(A) is viewed along the normal direction of the linearly polarized light reflection polarizer (B).

FIG. 9 is a conceptual representation showing the polarization axis directions of emitting light beams transmitted through the polarizing plate (A1) and then through the linearly polarized light reflection polarizer (B).

FIG. 10 is a conceptual representation showing the polarization axis directions of emitting light beams transmitted through the polarizing plate (A1) and then through a ½ wavelength plate (C).

FIG. 11 is an example of a sectional view of an optical element (X) of the invention.

FIG. 12 is an example of a sectional view of an optical element (Y) of the invention.

FIG. 13 is an example of a sectional view in a case where a polarizing plate (P) is laminated on an optical element (X) of the invention.

FIG. 14 is an example of a sectional view in a case where a polarizing plate (P) is laminated on an optical element (Y) of the invention.

FIG. 15 is conceptual representation showing conversion in kind of polarized light with a wavelength plate.

FIG. 16 is an example of a sectional view of a liquid crystal display using the optical element (Y) of the invention.

FIG. 17 is an example of a sectional view of a liquid crystal display using the optical element (Y) of the invention.

FIG. 18 is an example of a sectional view of a liquid crystal display using the optical element (Y) of the invention.

FIG. 19 is an example of a sectional view of a liquid crystal display using the optical element (Y) of the invention.

FIG. 20 is a graph showing a transmitted light intensity angular distribution of an optical element (X1) of Example 1.

FIG. 21 is a graph showing a transmitted light intensity angular distribution of an optical element (Y1) of Example 2.

FIG. 22 is a graph showing a transmitted light intensity angular distribution of the optical element (Y1) attached with a polarizing plate (P) of Example 3.

FIG. 23 is a graph showing a transmitted light intensity angular distribution of a liquid crystal display of Example 4.

FIG. 24 is a graph showing a transmitted light intensity angular distribution of a liquid crystal display of Example 5.

FIG. 25 is a graph showing a transmitted light intensity angular distribution of an optical element (X2) of Example 9.

FIG. 26 is a graph showing a transmitted light intensity angular distribution of a polarizing element (A-1) of Comparative Example 1.

FIG. 27 is a graph showing a transmitted light intensity angular distribution of an optical element of Comparative Example 2.

FIG. 28 is a graph showing a transmitted light intensity angular distribution of a liquid display of Comparative Example 3.

BEST MODE FOR CARRYING OUT THE INVENTION

A polarizing element (A) of the invention can be formed of a cholesteric liquid crystal layer with a reflection band width of 200 nm or more. The cholesteric liquid crystal layer can be formed with plural cholesteric liquid crystal layers having selective reflection bands different from one another. A polarizing element (A) of the invention can be, as described above, formed of a cholesteric liquid crystal layer in which a pitch length continuously varies in the thickness direction. Note that as shown in the polarizing element (A1) of FIG. 1 or the polarizing element (A2) of FIG. 2, cholesteric liquid crystal layers are properly selected in order control (in order to control the polarization axes of oblique emitting light).

A difference in axis direction of linearly polarized light in oblique transmitted light as in the polarization element (A1) and the polarization element (A2) can be controlled in an arbitrary way by a difference in order of lamination of the cholesteric liquid crystal layers or a difference in manufacturing method. In a case of a polarizing element causing separating light into polarization with a Brewster's angle adopted, which is general, transmitted light in an oblique direction is specifically defined and only a linearly polarized light having the polarization axis substantially parallel to the normal of an optical plane is obtained. A selective reflection width wavelength band of the polarizing element (A) preferably includes at least a wavelength of 550 nm.

(Lamination of Cholesteric Liquid Crystal Layers)

In a case where a polarizing element is a laminate of plural cholesteric liquid crystal layers having selective reflection bands different from one another, each of the plural cholesteric liquid crystal layers is laminated by properly selecting the plural cholesteric liquid crystal layers so that a reflective reflection band width thereof is 200 nm or more.

A proper cholesteric liquid crystal may be used as a cholesteric liquid crystal layer without imposing any specific limitation. Examples thereof that are named include: a liquid crystal polymer exhibiting a cholesteric liquid crystallinity at a high temperature; a polymerized liquid crystal obtained by polymerizing a liquid crystal monomer, and a chiral agent and an alignment agent, when both are required, with illumination of ionizing radiation such as an electron beam, ultraviolet or the like, or with heating; and a mixture thereof. While a liquid crystallinity may be either lyotropic or thermotropic, a thermotropic liquid crystal is desirable from the view point of ease of control and formability of monodomain.

Formation of a cholesteric liquid crystal layer can be performed by means of a method in conformity with a conventional alignment treatment. Exemplified are: a method in which a liquid crystal polymer is developed on a proper alignment film selected from the group: an alignment film obtained by being subjected to a rubbing treatment with a rayon cloth or the like on a film made of polyimide, polyvinyl alcohol, polyester, polyarylate, polyamide imide, polyether imide or the like formed on a support base material having as low a birefringence retardation as possible such as triacetyl cellulose, amorphous polyolefin or the like; an alignment film made of an obliquely evaporated layer made of $SiO_2$; an alignment film made of a base material using a surface nature and state of a stretched base material such as polyethylene terephthalate, polyethylene naphthalate or the like; an alignment film made of a base material with fine surface irregularity of projections and depressions having a fine alignment control force formed thereon obtained by treating a surface thereof with a fine grinding agent represented by a rubbing cloth or red iron oxide; an alignment film made of a base material having an alignment film producing a liquid crystal control force by illuminating an azobenzene compound or the like on a base material film described above with light formed thereon; and others, and the liquid crystal polymer is heated at a temperature of a glass transition temperature or higher and lower than an isotropic phase transition temperature and cooled at a temperature lower than the glass transition temperature in a planar alignment state of the liquid crystal polymer molecules into a glassy state to thereby form a fixed layer in which the alignment is fixed; and other methods. A structure may also be fixed by illuminating with energy such as ultraviolet, an ion beam or the like at a stage where an alignment state is established.

Film formation of a liquid crystal polymer can be performed by means of a method in which a liquid crystal polymer is developed into a thin film using a solution of the liquid crystal polymer with a solvent with one of the following techniques: such as a spin coating method; a roll coating method, a flow coating method, a printing method; a dip coating method; a flow film forming method; a bar coating method; a gravure printing method and others, to further dry the thin film, when required. Examples of the solvent that can be properly used include: chlorine containing solvents such as methylene chloride, trichloroethylene and tetrachloroethane; ketone solvents such as acetone, methyl ethyl ketone and cyclohexanone; aromatic solvents such as toluene; cycloalkanes such as cycloheptane; and N-methylpyrrolidone, tetrahydrofuran and others.

One of methods can be adopted in which a heat-melt of a liquid crystal polymer and preferably a heat-melt in a state exhibiting an isotropic phase is developed in a procedure in conformity with a procedure as described above, the developed film is further developed to a thinner film while a melting temperature is maintained, if necessary, and the thinner film is then solidified. The one method is a method using no solvent; therefore, a liquid crystal polymer can be developed by a method good in hygiene in a working environment as well.

Note that in development of a liquid crystal polymer, there can be adopted a superimposition scheme for cholesteric liquid crystal layers with alignment films interposed between layers for the purpose to realize a thinner, if necessary. The obtained cholesteric liquid crystal layers can also be separated from a support base material/an alignment base material therefore used in film formation and transferred onto another optical material for use when required.

As laminating methods for cholesteric liquid crystal layers, exemplified are a method in which plural cholesteric liquid crystal layers prepared separately are adhered to each other with an adhesive or a pressure-sensitive adhesive, a method for contact bonding cholesteric liquid crystal layers with each other after surfaces thereof are swollen or dissolved with a solvent or the like and a method for contact bonding cholesteric liquid crystal layers in heating or under an influence of supersonic wave. In addition, a method can be used in which after a cholesteric liquid crystal layer is prepared, cholesteric liquid crystal layers having different selective reflection central wavelength are superimposed.

(Cholesteric Liquid Crystal Layer in which Pitch Length Varies Continuously in Thickness Direction)

A cholesteric liquid crystal layer in which a pitch length varies continuously in the thickness direction is manufactured by means of a method in which a composition containing a liquid crystal monomer similar to that as described above is employed and the composition is irradiated with an ionizing radiation such as an electron beam or ultraviolet as described below. To be concrete, the following methods are exemplified: a method in which a difference in polymerization speed due to a difference in ultraviolet transmittance in the thickness direction (JP-A No. 2000-95883), a method in which extraction is conducted with a solvent to form a concentration gradient in the thickness direction (JP No. 3062150), a method in which a temperature is varied after a first polymerization and second polymerization is effected at a newly set temperature (U.S. Pat. No. 6,057,008) and the like.

A method is further preferably used, in which a step of coating a liquid crystal mixture containing a polymerizable mesogen (a) and a polymerizable chiral agent (b) on an alignment substrate and a step of irradiating the coat with ultraviolet from the substrate side in a state where the liquid crystal mixture in the coat is in contact with a gas containing oxygen to thereby polymerize and cure the coat are applied, and then a difference in polymerization speed in the thickness direction due to polymerization hindrance by oxygen increases by irradiation with ultraviolet from the substrate side (JP-A No. 2000-139953).

In connection with the method described in JP-A No. 2000-139953, a cholesteric liquid crystal layer with a broader reflection wavelength band can be obtained in a method described below.

For example, the latter method, as the ultraviolet polymerization, includes, as the ultraviolet polymerization step,: a first step (1) of irradiating the liquid crystal mixture with ultraviolet from the alignment substrate side at an ultraviolet irradiation intensity in the range of from 20 to 200 mW/cm$^2$ at a temperature of 20° C. or higher for a time in the range of 0.2 to 5 sec in a state where the liquid crystal mixture is in contact with a gas containing oxygen, a second step (2) of heating the liquid crystal layer at a temperature in the range of from 70 to 120° C. for 2 sec or longer in a state where the liquid crystal layer is in contact with the gas containing oxygen, a third step (3) of irradiating the liquid crystal mixture with ultraviolet from the alignment substrate side at an ultraviolet irradiation intensity lower than that in the first step (1) at a temperature of 20° C. or higher for a time of 10 sec or longer in a state where the liquid crystal layer is in contact with a gas containing oxygen and a fourth step (4) of irradiating the liquid crystal layer with ultraviolet in the absence of oxygen (JP-A No. 2003-93963).

A method can be exemplified, as the ultraviolet polymerization, including a first step (1) of irradiating the liquid crystal mixture with ultraviolet from the substrate side three times or more at an ultra violet irradiation intensity in the range of 1 to 200 mW/cm$^2$ at a temperature of 20° C. or higher for a time in the range of from 0.2 to 30 sec, wherein irradiation with ultraviolet in the range of the intensity is reduced and a time of ultraviolet irradiation is longer each time the irradiation is effected while times of irradiation is increased, and a second step (2) of irradiating the liquid crystal layer with ultraviolet in the absence of oxygen (JP-A No. 2003-94307).

A method can be exemplified, as the ultraviolet polymerization, including a first step (1) of irradiating the liquid crystal mixture with ultraviolet from the substrate side at an ultra violet irradiation intensity in the range of 20 to 200 mW/cm$^2$ at a temperature of 20° C. or higher for a time in the range of from 0.2 to 5 sec in a state where the liquid crystal mixture is in contact with a gas containing oxygen, and a second step (2) of irradiating the liquid crystal layer with ultraviolet from the substrate side at an ultraviolet irradiation intensity lower than that in the first step at a temperature higher than that in the first step (1) with a temperature rise rate of 2° C./min or more till a temperature reaches a temperature higher than that in he first step (1) and 60° C. or higher for a time of 10 sec or longer in a state where the liquid crystal layer is in contact with a gas containing oxygen and a third step (3) of irradiating the liquid crystal layer with ultraviolet in the absence of oxygen (JP-A No. 2003-94605).

Besides, the following method can be employed. In the method, a cholesteric liquid crystal layer, having a broad band reflection wavelength band and good in heat resistance can be obtained. For example, a liquid crystal mixture containing a polymerizable mesogen (a), a polymerizable chiral agent (b) and a photopolymerization initiator (c) is polymerized by irradiation with ultraviolet between two substrates (JP-A Nos. 2003-4346 and 2003-4101). A method is further exemplified in which a polymerizable ultraviolet absorbent (d) is further added to the liquid crystal mixture and the liquid crystal mixture is polymerized with ultraviolet between two substrates (JP-A No. 2003-4298). A method is further exemplified in which the liquid crystal mixture containing a polymerizable mesogen (a), a polymerizable chiral agent (b) and a photopolymerization initiator (c) is coated on an alignment substrate and the coat is polymerized with ultraviolet in an inert gas atmosphere (JP-A No. 2003-4406).

A method can be exemplified, as the ultraviolet polymerization, including, a first step (1) of irradiating the liquid crystal mixture with ultraviolet at an ultraviolet irradiation intensity in the range of from 10 to 200 mW/cm$^2$ at a temperature of 70° C. or higher for a time in the range of 0.1 to 5 sec in a state where the liquid crystal mixture is in contact with a gas containing oxygen, a second step (2) of heating the liquid crystal layer at a temperature of 70° C. or higher for a time of from 0.1 to 5 sec in a state where the liquid crystal layer is in contact with the gas containing oxygen and a third step (3) of irradiating the liquid crystal layer with ultraviolet after the first step (1) and the second step (2) in the absence of oxygen. It is preferable that a pair of the first (1) and the second step (2) is repeated plural times and thereafter, the ultraviolet irradiation step (3) is performed (JP-A No. 2004-71158).

A method can be exemplified, as the ultraviolet polymerization, including a first step (1) of irradiating the liquid crystal mixture with ultraviolet at an ultraviolet irradiation intensity in the range of from 10 to 200 mW/cm$^2$ at a temperature of 70° C. or higher for a time in the range of 0.01 to 5 sec in a state where the liquid crystal mixture is in contact with a gas containing oxygen, a second step (2) of heating the liquid crystal layer at a temperature of 70° C. or higher for a time of 5 sec or more in a state where the liquid crystal layer is in contact with the gas containing oxygen and a third step (3) of irradiating the liquid crystal layer with ultraviolet in the absence of oxygen after the first and second steps. It is preferable that a pair of the first step (1) and the second step (2) is repeated plural times and thereafter, the ultraviolet irradiation step (3) is performed (JP-A No. 2004-168666).

Note that a method for manufacturing a polarizing element (A2) is preferably the method described in JP-A No. 2003-96963.

Description will be given of a polymerizable mesogen compound (a) and a polymerizable chiral agent (b) and the like, which form a cholesteric liquid crystal layer below, while the materials can be used in not only a cholesteric liquid crystal layer in which a pitch length varies continuously in the thickness direction but also cholesteric liquid crystal layers used to form a laminate.

A polymerizable mesogen compound (a), when being used, preferably has at least one polymerizable functional group and in addition, a mesogen group including a ring unit and others. As polymerizable functional groups, exemplified are an acryloyl group, a methacryloyl group, an epoxy group, a vinyl ether group and others, among which preferable are an acryloyl group and a methacryloyl group. With a polymerizable mesogen compound (a) having two or more polymerizable functional groups employed, a crosslinked structure is introduced into a cholesteric liquid film to thereby enable durability thereof to be enhanced, as well. Examples of the ring unit constituting a mesogen group include: a biphenyl-based ring unit, a phenylbenzoate-based ring unit, a phenyl-cyclohexane-based ring unit, an azoxybenzene-based ring unit, an azomethine-based ring unit, an azobenzene-based ring unit, a phenylpyrimidine-based ring unit, a diphenylacetylene-based ring unit, a diphenylbenzoate-based ring unit, a bicyclohexane-based ring unit, a cyclohexylbenzene-based ring unit, a terphenyl-based ring unit and others. Note that an end of each of the ring units may has any of substituents such as a cyano group, an alkyl group, an alkoxy group, a halogen group. A mesogen group described above may bond with a spacer portion imparting bendability. As spacer portions, exemplified are a polymethylene chain, a polyoxymethylene chain and others. The number of repeated structural units constituting a spacer portion is properly determined according to a chemical structure of a mesogen moiety, wherein the number of repetition units in a polymethylene chain ranges from 0 to 20 and preferably from 2 to 12 and the number of repetition units in a polyoxymethylene chain ranges from 0 to 10 and preferably 1 to 3.

Molar absorption coefficients of the polymerizable mesogen compound (a) are preferably in the range of from 0.1 to 500 dm$^3$ mol$^{-1}$ cm$^{-1}$ at 365 nm, in the range of from 10 to 30,000 dm$^3$ mol$^{-1}$ cm$^{-1}$ at 334 nm, and in the range of from 1,000 to 100,000 dm$^3$ mol$^{-1}$ cm$^{-1}$ at 314 nm. A polymerizable mesogen compound (a) with the molar absorption coefficients has an ultraviolet absorbing function. Molar absorption coefficients of a polymerizable mesogen compound (a) are more preferably in the range of from 0.1 to 50 dm$^3$ mol$^{-1}$ cm$^{-1}$ at 365 nm, in the range of from 50 to 10,000 dm$^3$mol$^{-1}$ cm$^{-1}$ at 334 nm, and in the range of from 10,000 to 50,000 dm$^3$ mol$^{-1}$cm$^{-1}$ at 314 nm. Molar absorption coefficients of a polymerizable mesogen compound (a) are further more preferably in the range of from 0.1 to 10 dm$^3$ mol$^{-1}$ cm$^{-1}$ at 365 nm, in the range of from 1,000 to 4,000 dm$^3$ mol$^{-1}$ cm$^{-1}$ at 334 nm, and in the range of from 30,000 to 40,000 dm$^3$ mol$^{-1}$ cm$^{-1}$ at 314 nm. If the molar absorption coefficients are less than 0.1 dm$^3$ mol$^{-1}$cm$^{-1}$ at 365 nm, 10 dm$^3$ mol$^{-1}$ cm$^{-1}$ at 334 nm, and 1,000 dm$^3$ mol$^{-1}$ cm$^{-1}$ at 314 nm, a sufficient difference in polymerization rate is realized, which makes it difficult to realize a broad band. On the other hand, if the molar absorption coefficients are larger than 500 dm$^3$ mol$^{-1}$ cm$^{-1}$ at 365 nm, 30,000 dm$^3$ mol$^{-1}$cm$^{-1}$ at 334 nm, and 100,000 dm$^3$ mol$^{-1}$ cm$^{-1}$ at 314 nm, polymerization may not advance perfectly with the result of no completion of curing. Note that molar absorption coefficients are obtained by measuring spectrophotometric spectrum of each material, followed by calculation based on absorbance values obtained at 365 nm, 334 nm and 314 nm.

A polymerizable mesogen compound (a) having one polymerizable functional group is expressed, for example, by the following general formula 1:

[Formula 1]

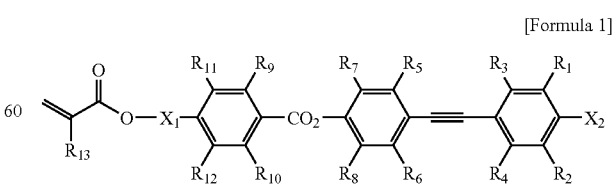

(wherein $R_1$ to $R_{12}$, which may be the same as or different from one another, indicates —F, —H, —CH$_3$, —C$_2$H$_5$, or —OCH$_3$, $R_{13}$ indicates —H or —CH$_3$, $X_1$ indicates a general formula (2) of —$(CH_2CH_2O)_a$—$(CH_2)_b$—$(O)_c$— and $X_2$ indicates —CN or —F, providing that a in the general formula (2) is an integer from 0 to 3, b therein is an integer from 0 to 12 and c therein is 0 or 1, wherein when a=1 to 3, b=0 and c=0 while when a=0, b=1 to 12 and c=0 to 1.)

As a polymerizable chiral agent (b), exemplified is LC756 manufactured by BASF Corp.

A mixing amount of a polymerizable chiral agent (b) is preferably in the range of from 1 to 20 parts by wt and more preferably in the range of from 2 to 5 parts by wt relative to 100 parts by wt of a total amount of a polymerizable mesogen compound (a) and the polymerizable chiral agent (b). A helical twist power (HTP) is controlled by a ratio of a polymerizable mesogen compound (a) and a polymerizable chiral agent (b). By adjusting the proportion within the range, a reflection band can be selected so that a reflectance spectrum of an obtained cholesteric liquid crystal film can cover a long wavelength band.

A liquid crystal mixture usually contains a photopolymerization initiators (c). As the photopolymerization initiators (c), exemplified are IRGACURE 184, IRGACURE 907, IRGACURE 369, IRGACURE 651 and others manufactured by Chiba Specialty Chemicals. A mixing amount of a photopolymerization initiator is preferably in the range of from 0.01 to 10 parts by wt and more preferably in the range of from 0.05 to 5 parts by wt relative to 100 parts by wt of a total amount of a polymerizable mesogen compound (a) and a polymerizable chiral agent (b).

A polymerizable ultraviolet absorbent (d) can be any of compounds having at least one polymerizable functional group and an ultraviolet absorbing function without a specific limitation. Concrete examples of such a polymerizable ultraviolet absorbent (d) include: for example, RUVA-93 manufactured by OTSUKA Chemical Co., Ltd and UVA935LH manufactured by BASF Ltd. and the like. A mixing amount of a polymerizable ultraviolet absorbent (d) is preferably in the range of from 0.01 to 10 parts by wt and more preferably in the range of from 2 to 5 parts by wt relative to 100 parts by wt of a total amount of a polymerizable mesogen compound (a) and a polymerizable chiral agent (b).

In order to broaden a band width of an obtained cholesteric liquid crystal film, an ultraviolet absorbent is mixed to thereby increase a difference in ultraviolet exposure intensity in the thickness direction. Besides, a photoreaction initiator with a large molar absorption coefficient is employed to the mixture thereby enable a similar effect to be obtained.

The mixture can be used as a solution. Examples of solvents each of which are preferably used in preparation of the solution, usually includes: halogenated hydrocarbons such as chloroform, dichloromethane, dichloroethane, tetrachloroethane, trichloroethylene, tetrachloroethylene, chlorobenzene and the like; phenols such as phenol, para-chlorophenol and the like; aromatic hydrocarbons such as benzene, toluene, xylene, methoxybenzene, 1,2-dimethoxybenzene and the like; in addition thereto acetone, methyl ethyl ketone, ethyl acetate, tert-butyl alcohol, glycerin, ethylene glycol, triethylene glycol, ethyleneglycol monomethyl ether, diethyleneglycol dimethyl ether, ethyl cellosolve, butyl cellosolve, 2-pytrolidone, N-methyl-2-pyrolidone, pyridine, triethylamine, tetrahydrofuran, dimethylformamide, dimethylacetoamide, dimethyl sulfoxide, acetonitorile, butyronitrile, carbon disulfide, cyclopentanone, cyclohexanone, and the like. No specific limitation is imposed on a solvent to be used and preferable are methyl ethyl ketone, cyclohexanone, cyclopentanone and the like. Since a concentration in a solution is dependent on a dissolubility of a thermotropic liquid crystal compound and a film thickness of a cholesteric liquid crystal film, which is a final object, the concentration cannot be definitely determined, but is generally preferably on the order in the range of from 3 to 50 wt %.

Note that in a case of manufacture of a cholesteric liquid crystal layer in which a pitch length varies continuously in the thickness direction as well, the alignment substrates exemplified above can be used. A similar aligning method can be adopted.

(Linearly Polarized Light Reflection Polarizer (B))

Examples of the linearly polarized light reflection polarizer (B) include: a grid type polarizer; a multilayer thin film laminate with two or more layers made of two or more kinds of materials having a difference between refractive indices; evaporated multilayer thin film having different refractive indexes used in a beam splitter or the like; a multi-birefringence layer thin film laminate with two or more layers made of two or more kinds of materials each having a birefringence; a stretched resin laminate with two or more layers containing two or more kinds of resins each having a birefringence; a polarizer separating linearly polarized light by reflecting/transmitting linearly polarized light in the axis directions perpendicular to each other; and others.

A uniaxially stretched multilayer laminate can be used that is obtained by uniaxially stretching a multilayer laminate obtained by alternately laminating materials generating a retardation by stretching represented by polyethylene naphthalate, polyethylene terephthalate and polycarbonate; and resins each generating a low retardation, such as an acrylic resin represented by polymethacrylate; and a norbornene resin and others represented by ARTON manufactured by JSR Corp. As concrete examples of the linearly polarized light reflection polarizer (B), exemplified are DBEF (Dual Brightness Enhancement film) manufactured by 3M Corp., PCF manufactured by NITTO DENKO Corp., or the like.

A selective reflection wavelength width of a linearly polarized light reflection polarizer (B) is, similarly to a polarizing element (A), desirably 200 nm or more, more desirably 300 nm or more and further more desirably 400 nm or more. In order to cover the visible light band, the width preferably covers the range of from 400 to 600 nm, to be concrete. It is desirable to extend a selective reflection wavelength band mainly to the longer wavelength side, in order to cover the visible light band regardless of an incidence angle, because of Shifting of a selective reflection wavelength band to the shorter wavelength side according to an incidence angle, to which, however, no limitation is imposed.

In a polarizing element (A) and a linearly polarized light reflection polarizer (B), selective reflection wavelength bands contain at least 550 nm and are overlapped one on the other by desirably 100 nm or more, more desirably 200 nm or more and further desirably 300 nm or more.

(½ Wavelength Plate (C))

Examples of the ½ wavelength plate (C) include: uniaxially stretched resin films or biaxially stretched resin films to thereby improve a viewing angle characteristic of films of resins such as polyethylene naphthalate, polyethylene terephthalate, polycarbonate, norbornene resin represented by Arton manufactured by JSR Corporation, polyvinyl alcohol, polystyrene, polymethyl methacrylate, polypropylene, other polyolefins, polyarylate, polyamide and the like; or a film obtained by fixing a nematic alignment state of a rod-like liquid crystal.

A ½ wavelength plate (C) is preferably a broad band wavelength plate having a retardation characteristic working as an almost ½ wavelength plate in the visible light band in order to make uniform optical characteristic of colors and suppress coloration. This is because if a change in retardation value is too large between wavelengths, a polarization characteristic for each wavelength is different from that of another wavelength to thereby affect shielding performances of wavelengths differently, leading to unpreferable visual recognition due to coloration. Such a ½ wavelength plate (C) preferably has a front retardation values, which is expressed by (nx−ny)×d, in the range of a ½ wavelength ±10% at wavelengths in the light source wavelength band (ranging from 420 to 650 nm), where a direction in which an in-plane refractive index is maximized is defined as X axis and a direction perpendicular to the X axis is defined as Y axis, where refractive indices in each axis directions are defined as nx and ny, respectively, and a thickness is defined as d (nm). A change of retardation value in the light source wavelength band is preferably small and desirably in the range of ±7% of ½ wavelength and more desirably in the range of ±5% of ½ wavelength.

Such a ½ wavelength plate (C) can impart a retardation corresponding to a ½ wavelength regardless of a wavelength of incident light by control of a wavelength dispersion characteristic through adoption of a laminate with axes different from one another composed of different kinds of retardation plates or molecular design.

Though a functioning wavelength band width is preferably wider, a characteristic of a ½ wavelength plate (C) desirably works in the range of from about 420 nm to about 650 nm since in a case of a cold cathode tube, emission central wavelengths of the light source are located at 435 nm for blue, at 545 nm for green and at 610 nm for red and respective brightlines have some level of half value widths for emission. A material of a retardation plate having such a characteristic is typically polyvinyl alcohol and materials molecular designed for an optical includes: Arton manufactured by JSR Corporation, norbornene films represented by ZENOR manufactured by Nippon Zeon Co., Ltd. and a PURE-ACE WR manufactured by TEIJIN CHEMICALS LTD and the like.

A ½ wavelength plate (C) desirably works as a ½ wavelength plate for an obliquely incident light. Since an optical path length of a ½ wavelength plate increases for an obliquely incident light, a retardation value varies to thereby generally create a phenomenon that a retardation is changed away from a value requested primarily. In order to prevent it from occurring, a retardation in the thickness direction of a ½ wavelength plate (C) is controlled to thereby preferably use a ½ wavelength plate in which a change in retardation due to an angular change is reduced. Thereby, a retardation equal to that for normally incident light can be imparted to an obliquely incident light.

A control coefficient for a retardation in the thickness direction is generally defined with an Nz coefficient. An Nz coefficient is expressed by Nz=(nx−nz)/(nx−ny), where a direction in which an in-plane refractive index is maximized is defined as X axis, a direction perpendicular to the X axis is defined as Y axis and a thickness direction of the film is defined as Z axis, where refractive indices in each axis directions are defined as nx, ny and nz. In order to impart a retardation value equal to that of normally incident light to obliquely incident light, it is preferable to establish a relation −2.5<Nz≦1. It is more preferable to establish a relation −2<Nz≦0.5. A retardation plate in which such a control in the thickness direction is applied is typically, as an example, an NRZ film manufactured by NITTO DENKO CORPORATION. Note that secondary transmission in an oblique direction cannot be prevented by a means of a method as shown in US No. 2003/63236 A. This is because revelation of a retardation in an oblique direction is not compatible with suppression of increase in retardation in an oblique direction. An advantage of the invention resides in the fact.

A ½ wavelength plate (C) may be constituted of a single retardation plate or a laminate of two or more retardation plates can be laminated so as to obtain a desired retardation. A thickness of a ½ wavelength plate (C) is preferably in the range of from 0.5 to 200 µm and especially preferably in the range of from −1 to 100 µm.

(Lamination of Layers)

An optical element of the present invention is not only disposed in an optical path in a simple manner, but can also be used by adhering. This is because since the optical element controls transmittance with a polarization characteristic thereof without using a surface profile, no air interface is required.

Lamination of each of the layers may be realized only by being laminated on a preceding layer, while it is preferable to laminate the layers with an adhesive agent or a pressure-sensitive adhesive agent from the viewpoint of workability and light utilization efficiency. In that case, it is desirable from the viewpoint of suppressed surface reflection that an adhesive agent or a pressure-sensitive adhesive agent is transparent and does not have absorption in the visible light region, and have refractive indexes closest possible to refractive indexes of the layers. Preferably used from the view point are an acrylic pressure-sensitive adhesive agent and the like. The following methods can be adopted: one method in which each of the layers forms monodomain with the help of an alignment film separately from the others and sequentially laminated by transfer the layers onto a light transparent base material; and the other in which each of the layers is sequentially formed directly on a preceding layer while forming an alignment film or the like for alignment in a proper manner.

It is possible to further add particles for adjusting diffusibility, when required, to thereby impart isotropic scatterbility, and to properly add an ultraviolet absorbent, an antioxidant, and a surfactant for a purpose to impartation of a leveling property in film formation, in each of the layers and (pressure-sensitive) adhesive layers.

(Light Condensation Backlight System)

A diffusion reflector plate is preferably disposed on a light source (on the other side of the light source from the side on which a liquid crystal cell is disposed). A main component of light reflected on a light collimating film is an obliquely incident component and regularly reflected on the light collimating film and returned in the backlight direction. Herein, in a case where a regular reflectance of a reflecting plate on the rear side is high, a reflection angle is kept as is and the reflected light cannot be emitted in the front direction only to end up with lost light. Therefore, a diffusion reflector plate is desirably disposed in order not to hold a reflection angle of reflected-back light as is and to thereby increase a scattering reflection component in the front direction.

Light condensation characteristic according to the present invention can controllably condense light in the front direction even in a case of a diffusion surface light source such as a direct under type backlight or an inorganic/organic EL element.

It is desired to insert a proper diffusing plate (D) between an optical element (X) or (Y) of the present invention and a backlight source (L). This is because light passes through obliquely, reflected light is scattered in the vicinity of a backlight guide and part of the reflected light is scattered in the vertically incident direction to thereby enhance a light recycling efficiency. As diffusing plates, exemplified are a plate having a surface unevenness shape and a plate made of a resin in which fine particles different in refractive index embedded. A diffusing plate may be inserted between the optical element (X) or (Y) and a backlight or adhered to the optical element (X) or (Y).

In a case where a liquid crystal cell (LC) to which an optical element (X) or (Y) is adhered is disposed in the proximity of the backlight, while there arises a chance to generate Newton's rings in a clearance between a film surface and the backlight, generation of Newton's rings can be suppressed by disposing a diffusing plate having a surface unevenness on a surface of a light guide plate of the optical element (X) or (Y) in the present invention. A layer that has both of a surface unevenness and a light diffusing structure may be formed on a surface itself of an optical element (X) or (Y) in this invention.

(Liquid Crystal Display)

The optical element (X) or (Y) is preferably applied to a liquid crystal display in which polarizing plates (P) are disposed on both sides of a liquid crystal cell (LC), and the optical element (X) or (Y) is disposed on the polarizing plate (P) side on the light source side surface of the liquid crystal cell. FIG. 13 and FIG. 14 are a state where a polarizing plate (P) is laminated on a linearly polarized light reflection polarizer (B). The optical element (X) or (Y) is arranged so to be the polarizing element (A) to the light source side.

In FIGS. 16 to 19, there are exemplified liquid crystal displays. In FIGS. 16 to 19, the optical element (Y) is exemplify used. There are shown a reflecting plate (RF) together with a light source (L). FIG. 16 shows a case where a direct under type backlight (L) is employed as a light source (L). FIG. 17 shows a case where a sidelight type light source (L) is employed as a light guide plate (S). FIG. 18 shows a case where a surface light source (L) is employed. FIG. 19 shows a case where a prism sheet (Z) is employed.

By laminating a diffusion plate having neither backscattering nor polarization cancellation on a viewer side of the liquid crystal cell of a liquid crystal display combined with the light collimating backlight system, light having a good display characteristic in the vicinity of the front is diffused to obtain a good and uniform display characteristic in all the viewing angle range, thereby enabling a viewing angle magnification to be realized.

A viewing angle magnifying layer used here is a diffusion plate having substantially no backscattering. A diffusion plate can be provided with a diffusion pressure-sensitive material. An arrangement place thereof can be used above or below a polarizing plate on the viewer side of the liquid crystal display. In order to prevent reduction in contrast due to an influence such as bleeding of pixels or a slightly remaining backscattering, the diffusion plate is desirably provided in a layer at a position closest possible to a cell such as between a polarizing plate and a liquid crystal cell. In this case, it is desirable to use a film that does not substantially cancel polarization. A fine particle distribution type diffusion plate is preferably used, which is disclosed in, for example, the publications of JP-A No. 2000-347006 and JP-A No. 2000-347007.

In a case where a viewing angle magnifying layer is disposed outside of a polarizing plate, a viewing angle compensating retardation plate may not be used especially if a TN liquid crystal cell is used since collimated lights are transmitted through a liquid crystal cell and through the polarizing plate. If an STN liquid crystal cell is used in the case, it has only to use a retardation film that is well compensated with respect to a front characteristic. Since, in this case, a viewing angle magnifying layer as a surface exposed to air, a type having a refractive effect due to a surface profile can also be employed.

On the other hand, in a case where a viewing angle magnifying film is inserted between a polarizing plate and a liquid crystal cell, light is diffused light at the stage where light is transmitted through the polarizing plate. If a TN liquid crystal is used, a necessity arises for compensating a viewing angle characteristic of the polarizer itself. In this case, it is preferable to insert a retardation plate to compensate a viewing angle characteristic of a polarizing plate between the polarizing plate and the viewing angle magnifying layer. If an STN liquid crystal is used, it is preferable to insert a retardation plate to compensate a viewing angle characteristic of the polarizer in addition to a front retardation compensation for the STN liquid crystal.

In a case of a viewing angle magnifying film having a regular structure in the interior thereof such as a microlens array or a hologram film, both conventionally having been available, interference has occurred with a fine structure such as a microlens array, a prism array, a louver, a micromirror array or the like that is included in a black matrix of a liquid crystal display or a collimation system of a conventional backlight to thereby cause a moiré pattern with ease. Since in a collimating film in this invention, a regular structure is not visually recognized in a plane thereof and emitted light has no regularity modulation, no necessity arises for consideration of matching with a viewing angle magnifying layer or an arrangement sequence. Therefore, a viewing angle magnifying layer has a lot of options since no specific limitation is imposed thereon, if neither interference nor a moire pattern occurs with a pixel black matrix of a liquid crystal display.

In this invention, as viewing angle magnifying layers, preferably used are a light scattering plate, having no substantial backscattering and not canceling polarization, which is described in any of the publications of JP-A Nos. 2000-347006 and 2000-347007 and which has a haze in the range of 80% to 90%. Any of layers each of which has a regular structure in the interior thereof such as a hologram sheet, a microprism array, a microlens array or the like can be used, if neither interference nor a moire pattern occurs with a pixel black matrix of a liquid crystal display.

(Other Materials)

Note that various other kinds of optical layers are properly employed according a common method to thereby, manufacture a liquid crystal display.

Commonly used is a polarizing plate having a protective film on one side or both sides of a polarizer.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned as a. Films made of heat curing type or ultraviolet ray curing type resins, such as acryl based, urethane based, acryl urethane based, epoxy based, and silicone based, etc. may be mentioned as materials of the above-mentioned transparent protective film.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in side chain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

In general, a thickness of the protection film, which can be determined arbitrarily, is 500 μm or less, preferably 1 to 300 μm, and especially preferably 5 to 200 μm in viewpoint of strength, work handling and thin layer Moreover, it is preferable that the protective film may have as little coloring as possible. Accordingly, a protective film having a retardation value in a film thickness direction represented by Rth=[(nx+ny)/2−nz]×d of −90 nm to +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of −90 nm to +75 nm in a thickness direction. The retardation value (Rth) in a thickness direction is preferably −80 nm to +60 nm, and especially preferably ±70 nm to +45 nm.

As a protective film, if polarization property and durability are taken into consideration, cellulose based polymer, such as triacetyl cellulose, is preferable, and especially triacetyl cellulose film is suitable. In addition, when the protective films are provided on both sides of the polarizer, the protective films comprising same polymer material may be used on both of a front side and a back side, and the protective films comprising different polymer materials etc. may be used. Adhesives are used for adhesion processing of the above described polarizer and the protective film. As adhesives, isocyanate derived adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of-adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 wt parts to the transparent resin 100 wt parts that forms the fine concavo-convex structure on the surface, and preferably 5 to 25 wt parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the transparent protective film.

A retardation plate is laminated on a polarizing plate as a viewing angle compensating film and used as a wide viewing angle polarizing plate. A viewing angle compensating film is a film for magnifying a viewing angle so as to enable an image to be viewed with relatively sharpness even in a case where a screen image of a liquid crystal display is viewed not in a direction normal to the screen but in a slightly oblique direction relative to the screen. As the retardation plates, employed are a ¼ wavelength plate and a ½ wavelength plate that are proper and meet the purpose of use. These materials include the same materials of the ½ wavelength plate (C), and are employed to be controlled retardation.

As such viewing angle compensating retardation plates, there are available, in addition thereto, a film having a birefringence obtained by a biaxially stretching treatment, a stretching treatment in two directions perpendicular to each other or the like and a biaxially stretched film such as an inclined alignment film. As inclined alignment film, for example, a film obtained using a method in which a heat shrinking film is adhered to a polymer film, and then the combined film is heated and stretched or shrunk under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

No specific limitation is, in addition to the above described condition, imposed on optical layers laminated when being actually used and there can be used one, or two or more optical layers that have an opportunity to be used in formation of a liquid crystal display and others, such as a reflection plate and a transflective plate. Examples thereof especially include: a reflection type polarizing plate and a transflective type polarizing plate obtained by laminating a reflection plate and a transflective plate, respectively, on an elliptic polarizing plate or a circular polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a transflective type elliptically polarizing plate, etc. in which the above-mentioned reflection type polarizing plate or a transflective type polarizing plate is combined with above described retardation plate respectively.

The elliptically polarizing plate or transflective type elliptically polarizing plate is laminated the polarizing plate or reflection type polarizing plate and the retardation plate by appropriately combination. As to the elliptically polarizing plate or the like, a (reflection type) polarizing plate and a retardation plate described above can be formed by sequentially laminating layers one at a time in a manufacturing process for a liquid crystal display, an optical film such as an elliptic polarizing plate or the like obtained by lamination in advance has an advantage of being excellent in quality stability, workability in lamination and others and enabling a production efficiency of a liquid crystal display to be improved.

A pressure-sensitive adhesive layer or an adhesive layer can also be provided in an optical element of this invention. A pressure-sensitive layer can be used for adherence to a liquid crystal cell and in addition, is used in lamination of optical layers. In adherence of the optical film, the optical axis thereof can be set at a proper arrangement angle in adaptation for a retardation characteristic as a target.

As the pressure sensitive adhesive agent or the adhesive agent is not especially limited. For example, polymers such as acrylic type polymers; silicone type polymers; polyesters, polyurethanes, polyamides, polyvinyl ethers, vinyl acetate/vinyl chloride copolymers, modified polyolefines, epoxy type; and rubber type such as fluorine type, natural rubber, synthetic rubber may be suitably selected as a base polymer. Especially, the one which is excellent in optical transparency, showing adhesion characteristics with moderate wettability, cohesiveness and adhesive property and has outstanding weather resistance, heat resistance, etc. may be preferably used.

The pressure sensitive adhesive agent or the adhesive agent adhesive may contain cross-linking agent according to a base polymer. And the adhesive agent adhesive may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

An adhesive agent and a pressure-sensitive adhesive agent each are usually used as an adhesive agent solution of a base polymer or a composition thereof dissolved or dispersed in a solvent at a solid matter concentration of the order in the range of from 10 to 50 wt %. An organic solvent can be properly selected from the group consisting of toluene, ethyl acetate and others; water; or others, so as to be adapted for a kind of an adhesive agent for use.

An adhesive layer and pressure-sensitive adhesive layer may also be prepared on one side or both sides of a polarizing plate or an optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of a polarizing plate or an optical film. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

EXAMLES

Description will be given, in a concrete manner, of the present invention using examples and comparative examples below and it should be understood that this invention is not limited by the examples in any way. Measurements are as described below.

(Reflection Wavelength Band)

A reflectance spectrum was measured with a spectrophotometer (manufactured by Otsuka Electronics Co., Ltd. with a trade name of Instant multi-photometric system MCPD-2000) and a wavelength band that includes a reflectance ½ times the maximum reflectance was determined as a reflection wavelength band.

(Distortion Rate)

In order to evaluate a distortion rate of a polarizing element, a transmission spectrum of a sample was measured with an Instant multi-photometer (manufactured by Otsuka Electronics Co., Ltd. with a trade name of MCPD-2000). In a case where natural light is launched onto a sample in a direction normal to the sample (so that emitting light from the front was measured) and in a case where a sample is set to a posture at an angle inclined from the normal direction by 60 degrees (60 degree emitting light was measured), states of light transmitted through the samples were measured on transmission spectra of light when a polarizing plate disposed on the emitting side was rotated 10 degrees at one time. The polarizing plate in use was a Glan-Thompson Prism polarizer (an extinction ratio of 0.00001 or less) manufactured by SIGMA KOKI CO., LTD. A distortion rate was obtained using the following formula for calculation. Distortion rate=minimum transmittance/maximum transmittance.

(Retardation):

A retardation of a wavelength plate is, where a direction in which an in-plane refractive index is maximized is defined as X axis, a direction perpendicular to the X axis is defined as Y axis and a thickness direction of the film is designed as Z axis, and refractive indices in the axis directions are defined as nx, ny and nz, the refractive indices nx, ny and nz at 550 nm were measured with an automatic birefringence measuring instrument (automatic birefringence meter KOBRA21ADH, manufactured by Oji Sceientific Instruments). The front retardation (nx−ny)×d was calculated with a thickness d (nm). Besides, an Nz coefficient was calculated.

A light source (diffusing light source) was Light Table KLV7000 manufactured by Hakuba K.K. Other measuring instruments were used for Haze measurement (with a trade name of haze meter HM150, manufactured by MURAKAMI COLOR RESEARCH LABORATORY), spectral characteristics of transmission/reflection (with a trade name of spectrophotometer U4100, manufactured by Hitachi, Ltd.), characteristics of a polarizing plate(with a trade name of DOT3, manufactured by MURAKAMI COLOR RESEARCH LABORATORY), brightness measurement (with a trade name of a brightness meter BM7, manufactured by TOPCON CORPORATION), brightness and tone angular distribution measuring instrument (with a trade name of Ez-Contrast, manufactured by ELDIM Inc.) and ultra violet irradiator (with a trade name of irradiator UVC321AM1, manufactured by Ushio Inc.).

Example 1

(Polarizing Element (A))

Five kinds of cholesteric liquid crystal polymers with selective reflection central wavelengths of 460 nm, 510 nm, 580 nm, 660 nm and 800 nm were prepared based on the specification of EP No. 0834754 A1.

A cholesteric polymer was manufactured with a polymerizable nematic liquid crystal monomer A expressed by the following chemical structure 2:

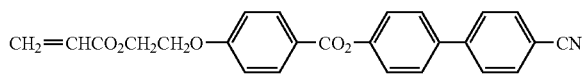

and a polymerizable chiral agent B expressed by the following chemical structure 3 in the following proportions (in wt ratios)

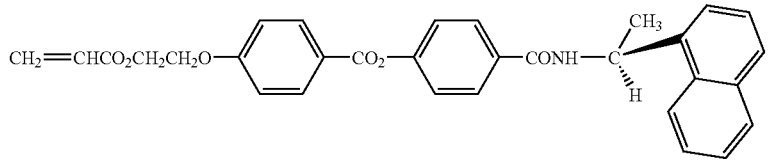

selective reflection central wavelength: monomer A/chiral agent B (mixing ratio): selective reflection wavelength band (nm)

| | | |
|---|---|---|
| 460 nm: | 9.2/1: | 430 to 490 nm |
| 510 nm: | 10.7/1: | 480 to 550 nm |
| 580 nm: | 12.8/1: | 540 to 620 nm |
| 660 nm: | 14.9/1: | 620 to 810 nm |
| 800 nm: | 17/1: | 700 to 900 nm |

The liquid crystal mixture was dissolved into tetrahydrofuran to obtain a 33% solution, thereafter, the solution was purged with nitrogen in a circumstance at 60° C., then, a reaction initiator (azobisisobutylonitrile, 0.5 wt % relative to the mixture) was added into the solution and polymerization was performed. An obtained polymer was subjected to reprecipitation separation with diethyl ether to thereby purify the polymer.

The cholesteric liquid crystal polymer was dissolved into methylene chloride to prepare a 10 wt % solution. The solution was coated on an alignment substrate to a thickness of about 1.5 μm after drying with a wire bar. A polyethylene terephthalate (PET) film with 75 μm in thickness and a polyimide alignment film was coated to a thickness of about 0.1 μm and rubbed with a layon rubbing cloth was used as an alignment substrate. The rubbed alignment film after coating was dried at 140° C. for 15 min. After the heat treatment, a liquid crystal was fixedly cooled thereon at room temperature to obtain a thin film.

Layers in colors were coated on the obtained liquid thin film one on another through steps similar to those described above and the layers were sequentially laminated from the longer wavelength side to the shorter wavelength side. Thereby, a laminate of cholesteric liquid crystal with a thickness of about 8 μm was obtained by laminating five liquid crystal layers in the order from the shorter wavelength side. The laminate of the obtained cholesteric liquid crystal was used after peeled off from the PET substrate. The obtained laminate made of the cholesteric liquid crystals had a selective reflection function in the range of from 430 nm to 900 nm. The laminate was used as a polarizing element (A1-1).

The polarizing element (A1-1) had a distortion rate in the front direction of about 0.55 and a distortion rate in a 60 degree oblique direction of about 0.05. Emitting light transmitted through the polarizing element (A1-1) was emitting linearly polarized light at a large incidence angle and the linearly polarized light had the polarization axis substantially perpendicular to the normal direction (the front) of a surface of the polarizing element.

(Linearly Polarized Light Reflection Polarizer (B))
DBEF manufactured by 3M was employed.

(Optical Element (X))
As shown in FIG. 11, the polarizing element (A1-1) and the linearly polarized light reflection polarizer (B) were sequentially laminated in the order with an acrylic-based pressure sensitive adhesive (No. 7) manufactured by NITTO DENKO CORPORATION: with a thickness of 20 μm to thereby obtain an optical element (X1).

(Evaluation of Characteristics)
The optical element (X1) was disposed on a diffusing light source with the polarizing element (A1-1) on the lower side and emitting light was measured. Results thereof are shown in FIG. 20. The optical element (X1) had a light condensing characteristic at the reflection axis azimuth of the linearly polarized light reflection polarizer (B). A light condensation half value width was ±32 degrees and transmission at a large angle was suppressed.

Example 2

(½ Wavelength Plate (C))
A retardation film made of polycarbonate manufactured by NITTO DENKO CORPORATION (TR film) was employed. A front retardation value was 270 nm, Nz=about 1.0, a thickness was 35 μm and a retardation value was about +8% at 430 nm and a retardation value was about −5% at 650 nm.

(Optical Element (Y))
A polarizing element (A1-1) and a linearly polarized light reflection polarizer (B) similar to those of Example 1 were used. The polarizing element (A1-1), a ½ wavelength plate (C), and the linearly polarized light reflection polarizer (B) were, as shown in FIG. 12, obtained by lamination with an acrylic-based pressure sensitive adhesive manufactured by NITTO DENKO CORPORATION (NO. 7) having a thickness of 20 μm to thereby obtain an optical element (Y1). In this case, an angle formed between the polarized light transmission axis of the linearly polarized light reflection polarizer (B) and the slow axis of the ½ wavelength plate (C) was 22.5 degrees.

(Evaluation of Characteristics)
The optical element (Y1) was disposed on a diffusing light source and emitting light was measured. Results thereof are shown in FIG. 21. An azimuth of 45 degrees relative to the polarized light transmission axis of the linearly polarized light reflection polarizer (B) resided in the vicinity of the half value width ±40 degrees. In this case, a transmission axis azimuth of the linearly polarized light reflection polarizer (B)

was shifted away from the x axis by 45 degrees to thereby enable an azimuth angle of total reflection to be shifted from that in Example 1.

Example 3

A polarizer (P) was adhered to the linearly polarized light reflection polarizer (B) side of the optical element (Y1) obtained in Example 2 with an acrylic-based pressure sensitive adhesive (NO. 7) manufactured by NITTO DENKO CORPORATION having a thickness of 20 μm so that an axis angle of the polarizing plate (P) was parallel to that of the linearly polarized light reflection polarizer (B). The polarizing plate (P) was NPF-TEG1465DU manufactured by NITTO DENKO CORPORATION.

(Evaluation of Characteristics)

The optical element (Y1) having the polarizing plate (P) was disposed on a diffusing light source and emitting light was measured. Results thereof are shown in FIG. 22. The optical element (Y1) having the polarizing plate (P) had a high emitting light intensity in the front direction in a similar way to that in Example 2 described above and it is understood that the optical element (Y1) having the polarizing plate (P) works as an optical element in which light is shielded in a oblique direction.

Example 4

A polarizing plate on the lower side of a TFT liquid crystal display (with a model No. LQ10D362/10.4/TFT) manufactured by Sharp Corp. was removed and the optical element (Y1) with the polarizing plate (P) obtained in Example 3 was adhered onto the TFT liquid crystal display without the polarizing plate on the lower side so that the polarization axis direction of the polarizing plate (P) coincides. Then, two prism sheets inserted between a backlight light guide plate and a liquid crystal cell were removed. A simplified construction was as shown in FIG. 17.

(Evaluation of Characteristics)

Emitting light was measured on the liquid crystal display. Results thereof are shown in FIG. 23. It is understood that the a liquid crystal display has an high emitting light intensity in the front direction and works as an optical element in which light is shielded in an oblique direction in a similar way to that in Example 3 described above even in the state where the liquid crystal display was attached.

Example 5

A liquid crystal display similar to Example 4 was prepared with the exception that in Example 4, the two prism sheets were not removed. A simplified construction was as shown in FIG. 19.

(Evaluation of Characteristics)

Emitting light was measured on the liquid crystal display. Results thereof are shown in FIG. 24. It is understood that the liquid crystal display has a high emitting light intensity in the front direction and works as an optical element in which light is shielded in an oblique direction in a similar way to that in Example 4 described above even in the state where the prism sheets are inserted.

Example 6

(Polarizing Element (A))

Mixed together were 96 parts by wt of a photopolymerizable mesogen compound (a polymerizable nematic liquid crystal monomer) expressed by the following chemical structure 4,

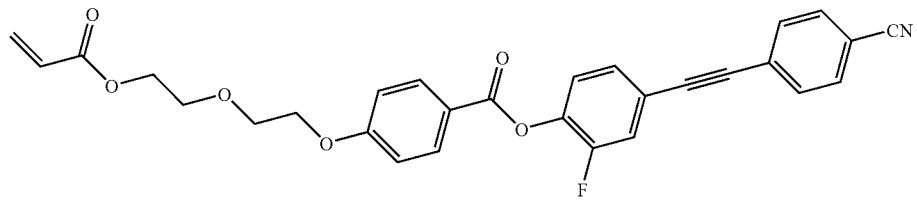

4 parts by wt of a polymerizable chiral agent (with a trade name of LC756, manufactured by BASF Ltd.) and an adjusted quantity of a solvent (methyl ethyl ketone) to thereby prepare a solution and further, added into the solution was 5 wt % of a photopolymerization initiator (with a trade name of IRGACURE 184, manufactured by Ciba Specialty Chemicals Inc.) relative to a solid matter of the solution to thereby obtain a coating liquid (with a solid matter content of 20 wt %). The coating liquid was cast on a stretched PET film (an alignment substrate) and the wet coat was dried at 80° C. for 2 min and thereafter, another PET substrate was laminated. Then, the laminate was irradiated with ultraviolet at an intensity of 3 mW/cm$^2$ for 5 min while being heated at 120° C. to thereby obtain a cholesteric liquid crystal layer. Still another substrate was transferred on the surface of the one PET substrate using an isocyanate-based adhesive, while the other PET substrate was removed. The obtained cholesteric liquid crystal layer has a thickness of 9 μm and a selective reflection band in the range of from 430 nm to 860 mn.

A pitch length was measured on a sectional TEM photograph. A cholesteric pitch varies almost continuously in the thickness direction. The cholesteric liquid crystal layer was used as a polarizing element (A1-2).

The polarizing element (A1-2) had a distortion rate in the front direction of about 0.99 and a distortion rate in the 60 degree oblique direction of about 0.10. Emitting light transmitted through the polarizing element (A1-2) was linear polarized light in a case where an incidence angle was large and the linearly polarized light had the polarization axis in a direction substantially perpendicular to the normal direction (the front) of a surface of the polarizing element.

(Optical Element (X))

An optical element (X2) was obtained in a similar way to that in Example 1 with the exception that in Example 1, the polarizing element (A1-2) was employed instead of the polarizing element (A1-1).

(Evaluation of Characteristics)

The optical element (X2) was disposed on a diffusing light source and emitting light was measured. Results thereof are almost equal to those of Example 1.

Example 7

(Polarizing Element (A))

Mixed together were 96 parts by wt of a photopolymerizable mesogen compound (a polymerizable nematic liquid crystal monomer) expressed by the above chemical structure 4, 4 parts by wt of a polymerizable chiral agent (with a trade name of LC756, manufactured by BASF Ltd.) and an adjusted quantity of a solvent (cyclopentanone) to thereby prepare a solution and thereafter, added into the solution was 0.5 wt % of a photopolymerization initiator (with a trade name of IRGACURE 907, manufactured by Ciba Specialty Chemicals Inc.) relative to a solid matter of the solution to thereby obtain a coating liquid (with a solid matter content of 30 wt %). The coating liquid was cast on a stretched PET film (an alignment substrate) with a wire bar so that a thickness of the coat after drying was 7 μm and the wet coat was dried at 100° C. for 2 min to evaporate the solvent. Then, the obtained film was subjected to first irradiation with ultraviolet from the PET side at an intensity of 40 mW/cm$^2$ for 1.2 sec in an air atmosphere at 40° C. In succession, the laminate was further subjected to second irradiation at an intensity of 4 mW/cm$^2$ for 60 sec while being heated up to 90° C. at a temperature rise rate of 3° C./sec in an air atmosphere. Then, the laminate was subjected to a third irradiation with ultraviolet from the PET side at a intensity of 60 mW/cm$^2$ for 10 sec in a nitrogen atmosphere to thereby obtain a cholesteric liquid crystal layer with a selective reflection band in the range from 425 to 900 nm.

A pitch length was measured on a sectional TEM photograph. A cholesteric pitch varies almost continuously in the thickness direction. The cholesteric liquid crystal layer was used as a polarizing element (A1-3).

The polarizing element (A1-3) had a distortion rate in the front direction of about 0.99 and a distortion rate in the 60 degree oblique direction of about 0.04. Emitting light transmitted through the polarizing element (A1-3) was linear polarized light in a case where an incidence angle was large and the linearly polarized light had the polarization axis in a direction substantially perpendicular to the normal direction (the front) of the surface of the polarizing element.

(Optical Element (X))

An optical element (X3) was obtained in a similar way to that in Example 1 with the exception that in Example 1, a polarizing element (A1-3) was employed instead of the polarizing element (A1-1).

(Evaluation of Characteristics)

The optical element (X3) was disposed on a diffusing light source and emitting light was measured. Results thereof are almost equal to those of Example 1.

Example 8

(Polarizing Element (A))

Mixed together were 96 parts by wt of a photopolymerizable mesogen compound (a polymerizable nematic liquid crystal monomer) expressed by the above chemical structure 4, 4 parts by wt of a polymerizable chiral agent (with a trade name of LC756, manufactured by BASF Ltd.) and an adjusted quantity of a solvent (cyclopentanone) to thereby prepare a solution so that a selective reflection central wavelength was 550 nm and thereafter, added into the solution was 3 wt % of a photopolymerization initiator (with a trade name of IRGACURE 907, manufactured by Ciba Specialty Chemicals Inc.) relative to a solid matter of the solution to thereby obtain a coating liquid (with a solid matter content of 30 wt %). The coating liquid was cast on a stretched PET film (an alignment substrate) with a wire bar so that a thickness of the coat after drying was 6 μm and the wet coat was dried at 100° C. for 2 min to evaporate the solvent. Then, the obtained film was subjected to first irradiation with ultraviolet from the PET side at an intensity of 50 mW/cm$^2$ for 1 sec in an air atmosphere at 40° C. Thereafter, the laminate was heated at 90° C. for 1 min without applying irradiation with ultraviolet (a selective reflection band after heating was in the range of from 420 to 650 nm). Then, the laminate was subjected to second irradiation with ultraviolet at an intensity of 5 mW/cm$^2$ for 60 sec in an air atmosphere (a selective reflection band after irradiation was in the range of from 420 to 900 nm). Then, the laminate was subjected to third irradiation with ultraviolet from the PET side at an intensity of 80 mW/cm$^2$ for 30 sec in a nitrogen atmosphere to thereby obtain a cholesteric liquid crystal layer with a selective reflection band in the range from 425 to 900 nm.

A pitch length was measured on a sectional TEM photograph. A cholesteric pitch varies almost continuously in the thickness direction. The cholesteric liquid crystal layer was used as a polarizing element (A1-4).

The polarizing element (A1-4) had a distortion rate in the front direction of about 0.99 and a distortion rate in the 60 degree oblique direction of about 0.04. Emitting light transmitted through the polarizing element (A1-4) was linear polarized light in a case where an incidence angle was large and the linearly polarized light had the polarization axis in a direction substantially perpendicular to the normal direction (the front) of a surface of the polarizing element.

(Optical Element (X))

An optical element (X4) was obtained in a similar way to that in Example 1 with the exception that in Example 1, a polarizing element (A1-4) was employed instead of the polarizing element (A1-1).

(Evaluation of Characteristics)

The optical element (X4) was disposed on a diffusing light source and emitting light was measured. Results thereof are almost equal to those of Example 1.

Example 9

(Polarizing Element (A))

Seven kinds of cholesteric liquid crystal polymers were manufactured with selective reflection central wavelengths of 410 nm, 460 nm, 510 nm, 580 nm, 660 nm, 750 nm and 850 nm, respectively, based on EPA No. 0834754 A.

The cholesteric polymers were manufactured by polymerizing a mixture of a polymerizable nematic liquid crystal monomer A used in Example 1 and a polymerizable chiral agent B at proportions (wt ratio) described below: selective reflection central wavelength: monomer A/chiral agent B (mixing ratio): selective reflection wavelength band (nm)

| 410 nm: | 8.5/1: | 380 to 440 nm |
| 460 nm: | 9.2/1: | 430 to 490 nm |
| 510 nm: | 10.7/1: | 480 to 550 nm |

-continued

| | | |
|---|---|---|
| 580 nm: | 12.8/1: | 540 to 620 nm |
| 660 nm: | 14.9/1: | 620 to 810 nm |
| 800 nm: | 17/1: | 700 to 900 nm |
| 850 nm: | 20/1: | 800 to 1000 nm |

The liquid crystal mixture was dissolved into tetrahydrofuran to obtain a 33% solution, thereafter, the solution was purged with nitrogen in a circumstance at 60° C. and then, a reaction initiator (azobisisobutylonitrile, 0.5 wt % relative to the mixture) was added into the solution and polymerization was effected. An obtained polymer was subjected to reprecipitation separation with diethyl ether to thereby purify the polymer.

A cholesteric liquid crystal polymer described above was dissolved into methylene chloride to prepare a 10 wt % solution. The solution was coated on an alignment substrate to a thickness of about 1.5 µm after drying with a wire bar. Used as the alignment substrate was a polyethylene terephthalate (PET) film with 75 µm in thickness, on a surface of which a polyimide alignment film was formed by coating to a thickness of about 0.1 µm, which was rubbed with rayon rubbing cloth. The substrate after coating was dried at 140° C. for 15 min. After the heat treatment, a liquid crystal was fixedly cooled thereon at room temperature to obtain a thin film.

Layers in colors were coated on the obtained liquid thin film one on another through procedure similar to that described above and the layers were sequentially laminated from the longer wavelength side to the shorter wavelength side. Thereby, a laminate of cholesteric liquid crystal with a thickness of about 8 µm was obtained by laminating seven liquid crystal layers in the order from the shorter wavelength side. The laminate of the obtained cholesteric liquid crystal was used after being peeled off from the PET substrate. The laminate made of the obtained cholesteric liquid crystals had a selective reflection function in the range of from 380 nm to 1000 nm. The laminate was used as a polarizing element (A2-1).

The polarizing element (A2-1) had a distortion rate in the front direction of about 0.95, a distortion rate in a 30 degree oblique direction of about 0.25 and a distortion rate in a 60 degree oblique direction of about 0.10. Emitting light transmitted through the polarizing element (A2-1) is linearly polarized light at a large incidence angle and the linearly polarized light has the polarization axis substantially parallel to the normal direction (the front) of a surface of the polarizing element.

(Linearly Polarized Light Reflection Polarizer (B))

DBEF manufactured by 3M was employed.

(Optical Element (X))

The polarizing element (A2-1) and the linearly polarized light reflection polarizer (B), as shown in FIG. 11, were laminated in the order using an acrylic-based pressure sensitive adhesive (No. 7) manufactured by NITTO DENKO CORPORATION with a thickness of 20 µm to thereby obtain an optical element (X2).

(Evaluation of Characteristics)

The optical element (X2) was disposed on a diffusing light source with the polarizing element (A2-1) on the lower side and emitting light was measured. Results thereof are shown in FIG. 25. The optical element (X2) has a light condensing characteristic at a reflection axis azimuth of the linearly polarized light reflection polarizer (B). A light condensation half value width was ±39 degrees and transmission at a large angle was suppressed.

Comparative Example 1

The polarizing element (A-1) used in Example 1 was disposed on the diffusion light source and emitting light was measured. Results thereof are shown in FIG. 26. No light was condensed in a direction from top to bottom or from left to right.

Comparative Example 2

A retardation layer was adhered onto the polarizing element (A-1) used in Example 1 and then, the polarizing element (A-1) was adhered to a rotatory polarizer to thereby obtain an optical element. An acrylic-based pressure sensitive adhesive NO. 7 (with a thickness of 25 µm) manufactured by NITTO DENKO CORPORATION was used for adhesion and the polarization transmission axes of the linearly polarized light reflection polarizers (B) was almost parallel to each other.

The retardation layer was manufactured in a way described below: A liquid crystal monomer (LC242, manufactured by BASF Ltd.), a chiral agent (LC756, manufactured by BASF Ltd.) and a polymerization initiator (IRGACURE 907, manufactured by Ciba Specialty Chemicals Inc.) at a wt ratio of LC242/LC756/IRGACUR 907=88/11/3 were dissolved into a solvent (methyl ethyl ketone) so that a selective reflection central wavelength was 200 nm to thereby obtain a 20 wt % solution.

A wire bar coater was used to coat the solution on a PET substrate (Lumirror, manufactured by TORAY INDUSTRIES Inc. with a thickness of 75 µm) to a thickness of 6 µm after drying and the wet coat was heated at 80° C. for 2 min to thereby remove a solvent by evaporation, and after the liquid crystal monomer was once heated up to an isotropic dislocation temperature, and the solvent was removed by evaporation, the coat was gradually cooled to thereby form a layer in a uniform alignment state. The obtained film was irradiated with ultraviolet to thereby fix an alignment state thereof and to obtain a C plate layer. Retardations of the C plate were measured with the results that retardation in the front direction was 2 nm and retardation at a 30 degree oblique direction was 165 nm for light with a wavelength of 550 nm.

The optical element was disposed on a diffusing light source and emitting light was measured. Results thereof are shown in FIG. 27. The optical element condenses light beams in all azimuths and a half value width was 35 degrees. However, light leakage was able to be recognized due to radiation at an angle in the vicinity of 60 degrees. Moreover, it was visually observed that light was colored in red at the angle of light leakage.

Comparative Example 3

A polarizing plate, on the lower side, of a TFT liquid crystal display manufactured by Sharp Corp. (with a model No. LQ10D362/10.4/TFT) used in Example 5 was not peeled off, but the two prism sheets inserted between a backlight light guide plate and a liquid crystal cell were removed and thereafter, emitting light was measured. Results thereof are shown in FIG. 28. Effectiveness is understood that light is condensed so that a front brightness was low, in a state of the liquid crystal display attached thereto.

Comparative Example 4

A sample described below was manufactured according to an example described in WO 03/27756 A1. A rotatory polarizer r was adhered to the linearly polarized light reflection polarizer (B) used in Example 1 and the linearly polarized light reflection polarizer (B) was adhered to the rotatory polarizer. An acrylic-based pressure sensitive adhesive NO. 7 (with a thickness of 25 µm) manufactured by NITTO DENKO CORPORATION was used for adhesion and the polarized light transmission axes were almost parallel to each other.

The rotatory polarizer was manufactured in a way described below. A liquid crystal monomer (LC242, manufactured by BASF Ltd.), a chiral agent (LC756, manufactured by BASF Ltd.) and a polymerization initiator (IRGACURE 369, manufactured by Ciba Specialty Chemicals Inc.) at a wt ratio of LC242/LC756/IRGACURE 369=96.4/0.1/3.5 were dissolved into a solvent (methyl ethyl ketone) to thereby prepare a 20 wt % solution. A wire bar coater was used and the solution was coated on a PET substrate (Lumirror, manufactured by TORAY INDUSTRIES Inc. with a thickness of 75 µm), the wet coat was heated at 80° C. for 2 min to remove the solvent by evaporation and the coat was polymerized and cured with an ultraviolet irradiator in an atmosphere after nitrogen gas purge. A thickness of the obtained cured liquid crystal was about 6 µm. An optical rotary power of the sample was about 85 degrees.

A polarizing element obtained by laminating the linearly polarized light reflection polarizer (B), the rotatory polarizer and the linearly polarized light reflection polarizer (B) has a selective reflection function in the range of from 380 to 1100 nm. The optical rotator has a distortion rate of 0.01 or less in the front direction and a distortion rate of 0.01 or less in a 60 degree oblique direction and no unique incidence angle dependence occur with respect to transmittance. The polarizing element shows a performance almost equal to that of a polarizing element obtained by adhering DBEF to DBEF at an axis angle of about 85 degrees.

The invention claimed is:

1. An optical element comprising:
    a polarizing element (A), separating incident light into polarization to then emit light, and made of a cholesteric liquid crystal, and
    a linearly polarized light reflection polarizer (B) transmitting linearly polarized light with one polarization axis and selectively reflecting linearly polarized light with the other polarization axis perpendicular to the one polarization axis, wherein
    the polarizing element (A) and the linearly polarized light reflection polarizer (B) are laminated in the optical element; and
    the polarizing element (A) has a distortion rate with respect to emitting light to incident light in the normal direction of 0.5 or more and
    a distortion rate with respect to emitting light to incident light at an angle inclined from the normal direction by 60 degrees or more of 0.2 or less, and
    wherein a reflection band width of the polarizing element (A) is 200 nm or more, and
    a twist pitch length of a cholesteric liquid crystal in the polarizing element (A) varies along the thickness direction;
    wherein the polarizing element (A) is capable of increasing a linearly polarized light component of emitting light as incidence angle increases, and
    wherein a polarization axis of the linearly polarized light of emitting light is substantially perpendicular or substantially parallel to the normal direction of a surface of the polarizing element.

2. The optical element according to claim 1, wherein, in the polarizing element (A), the linearly polarized light component of emitting light increasing as incidence angle increases has a polarization axis of linearly polarized light substantially perpendicular to the normal direction of a surface of the polarizing element.

3. The optical element according to claim 1, wherein, in the polarizing element (A), the linearly polarized light component of emitting light increasing as incidence angle increases has a polarization axis of linearly polarized light substantially parallel to the normal direction of a surface of the polarizing element.

4. The optical element according to claim 1, wherein the polarizing element (A) substantially reflects a non-transmission component of incident light.

5. The optical element according to claim 1, wherein a thickness of the polarizing element (A) is 2 µm or more.

6. The optical element according to claim 1, wherein the linearly polarized light reflection polarizer (B) is a grid type polarizer.

7. The optical element according to claim 1, wherein the linearly polarized light reflection polarizer (B) is a multilayer thin film laminate with two or more layers made of two or more kinds of materials having a difference between refractive indices.

8. The optical element according to claim 7, wherein the thin multilayer laminate is a vapor-deposited thin film.

9. The optical element according to claim 1, wherein the linearly polarized light reflection polarizer (B) is a multi-birefringence layer thin film laminate with two or more layers made of two or more kinds of materials each having a birefringence.

10. The optical element according to claim 9, wherein the thin multilayer laminate is a stretched resin laminate with two or more layers containing two or more kinds of resins each having a birefringence.

11. An optical element comprising a ½ wavelength plate (C) sandwiched between the polarizing element (A) and the linearly polarized light reflection polarizer (B) in the optical element according to claim 1.

12. The optical element according to claim 11, wherein the ½ wavelength plate (C) is a broad band wavelength plate working as an almost ½ wavelength plate over the entire visible light band.

13. The optical element according to claim 12, wherein the ½ wavelength plate (C) has a front retardation values, which is expressed by $(n_x - n_y) \times d$, in the range of a ½ wavelength ±10% at wavelengths in the light source wavelength band (ranging from 420 to 650 nm),
    where a direction in which an in-plane refractive index is maximized is defined as X axis and a direction perpendicular to the X axis is defined as Y axis, where refractive indices in each axis directions are defined as $n_x$ and $n_y$, respectively, and a thickness is defined as d (nm).

14. The optical element according to claim 11, wherein the ½ wavelength plate (C) controls a retardation in the thickness direction and reduces a change in retardation caused by a change in angle.

15. The optical element according to claim 14, wherein the ½ wavelength plate (C) has an Nz coefficient, which is expressed by $N_z = (n_x - n_z)/(n_x - n_y)$, in a relation of $-2.5 < N_z \leq 1$, where a direction in which an in-plane refractive index is maximized is defined as X axis, a direction perpendicular to the X axis is defined as Y axis and a thickness direction of the film is defined as Z axis, where refractive indices in each axis directions are defined as nx, ny and nz.

16. The optical element according to claim 1, wherein a polarizing plate is disposed outside of the linearly polarized light reflection polarizer (B) so that the polarized light transmission axis of the linearly polarized light reflection polarizer (B) and the polarization axis direction of the polarizing plate coincide with each other.

17. The optical element according to claim 1, wherein layers are laminated with a transparent adhesive or pressure sensitive adhesive.

18. A light condensation backlight system, in which at least a light source is provided for the optical element according to claim 1.

19. The light condensation backlight system according to claim 18, comprising a primary light condensor wherein a condensed light is in the angular range of ±60 degrees from the normal direction.

20. The light condensation backlight system according to claim 19, wherein the primary light condensor is a microprism sheet array disposed on the light source.

21. A light condensation backlight system, in which at least a light source is provided for the optical element according to claim 11.

22. The light condensation backlight system according to claim 21, comprising a primary light condensor wherein in condensed light is in the angular range of ±60 degrees from the normal direction.

23. The light condensation backlight system according to claim 22, wherein the primary light condensor is a microprism sheet array disposed on the light source.

24. A light condensation backlight system, in which at least a light source is provided for the optical element according to claim 16.

25. The light condensation backlight system according to claim 24, comprising a primary light condensor wherein in condensed light is in the angular range of ±60 degrees from the normal direction.

26. The light condensation backlight system according to claim 25, wherein the primary light condensor is a microprism sheet array disposed on the light source.

27. A liquid crystal display, in which at least a liquid crystal cell is provided for the light condensation backlight system according to claim 25.

28. The liquid crystal display according to claim 27, comprising a diffusing plate neither backscattering nor depolarizing laminated on the viewing side of the liquid crystal cell.

29. The optical element according to claim 1, wherein the laminated optical element has more than one cholesteric liquid crystal layer wherein each has a central wavelength that is different from each other.

30. The optical element according to claim 1, wherein the twist pitch length continuously alters in the thickness length.

* * * * *